United States Patent
Tsarfati et al.

(10) Patent No.: US 11,743,032 B2
(45) Date of Patent: *Aug. 29, 2023

(54) IDENTITY-BASED SECURITY LAYER FOR PERIPHERAL COMPUTING DEVICES

(71) Applicant: CyberArk Software Ltd., Petach-Tikva (IL)

(72) Inventors: Omer Tsarfati, Petach-Tikva (IL); Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,299

(22) Filed: Jan. 25, 2022

(65) Prior Publication Data
US 2022/0321328 A1 Oct. 6, 2022

Related U.S. Application Data

(63) Continuation of application No. 17/219,333, filed on Mar. 31, 2021, now Pat. No. 11,245,517.

(51) Int. Cl.
*H04L 9/08* (2006.01)
(52) U.S. Cl.
CPC ............ *H04L 9/0825* (2013.01); *H04L 9/083* (2013.01); *H04L 9/0822* (2013.01)
(58) Field of Classification Search
CPC ..... H04L 9/0825; H04L 9/0822; H04L 9/083; H04L 9/0891; H04L 9/0897; H04L 9/3239; H04L 9/3271
See application file for complete search history.

(56) References Cited

U.S. PATENT DOCUMENTS

| | | | |
|---|---|---|---|
| 7,907,735 B2 * | 3/2011 | Fascenda | H04K 1/00 380/278 |
| 8,316,237 B1 * | 11/2012 | Felsher | H04L 9/3249 380/282 |
| 10,404,464 B2 | 9/2019 | Kamal | |

(Continued)

FOREIGN PATENT DOCUMENTS

| EP | 1612747 A1 | 1/2006 |
|---|---|---|
| EP | 3477531 A1 | 5/2019 |
| WO | WO-2019130042 A1 | 7/2019 |

OTHER PUBLICATIONS

Extended European Search Report, issued by European Patent Office, corresponding to European Application No. 21194676.9 (8 pages).

*Primary Examiner* — Abiy Getachew
(74) *Attorney, Agent, or Firm* — FINNEGAN, HENDERSON, FARABOW, GARRETT & DUNNER, LLP

(57) ABSTRACT

Described herein are methods, systems, and computer-readable storage media for participating in a validation process with the host computing device. Techniques include receiving, from the host computing device, a second key that is part of a cryptographic key pair comprising a first key and the second key. Techniques further include, encrypting, using the second key and as part of the validation process, data at the peripheral device and sending the encrypted data to the host computing device. Further, the host computing device validates an identity of the peripheral device based on a decryption, using the first key, of the encrypted data.

20 Claims, 15 Drawing Sheets

(56) References Cited

U.S. PATENT DOCUMENTS

| | | |
|---|---|---|
| 10,484,372 B1* | 11/2019 | Johansson ............. H04L 63/083 |
| 10,938,792 B2* | 3/2021 | Bikumala ........... H04L 63/0823 |
| 2003/0233550 A1 | 12/2003 | Brickell |
| 2010/0017840 A1* | 1/2010 | Akins, III ............ H04N 21/443 |
| | | 725/131 |
| 2015/0382189 A1* | 12/2015 | Zhang ............... H04W 12/0431 |
| | | 380/283 |
| 2016/0127326 A1 | 5/2016 | Lin |
| 2017/0124558 A1 | 5/2017 | Molnar |
| 2020/0145219 A1* | 5/2020 | Sebastian ................ G06F 21/32 |

* cited by examiner

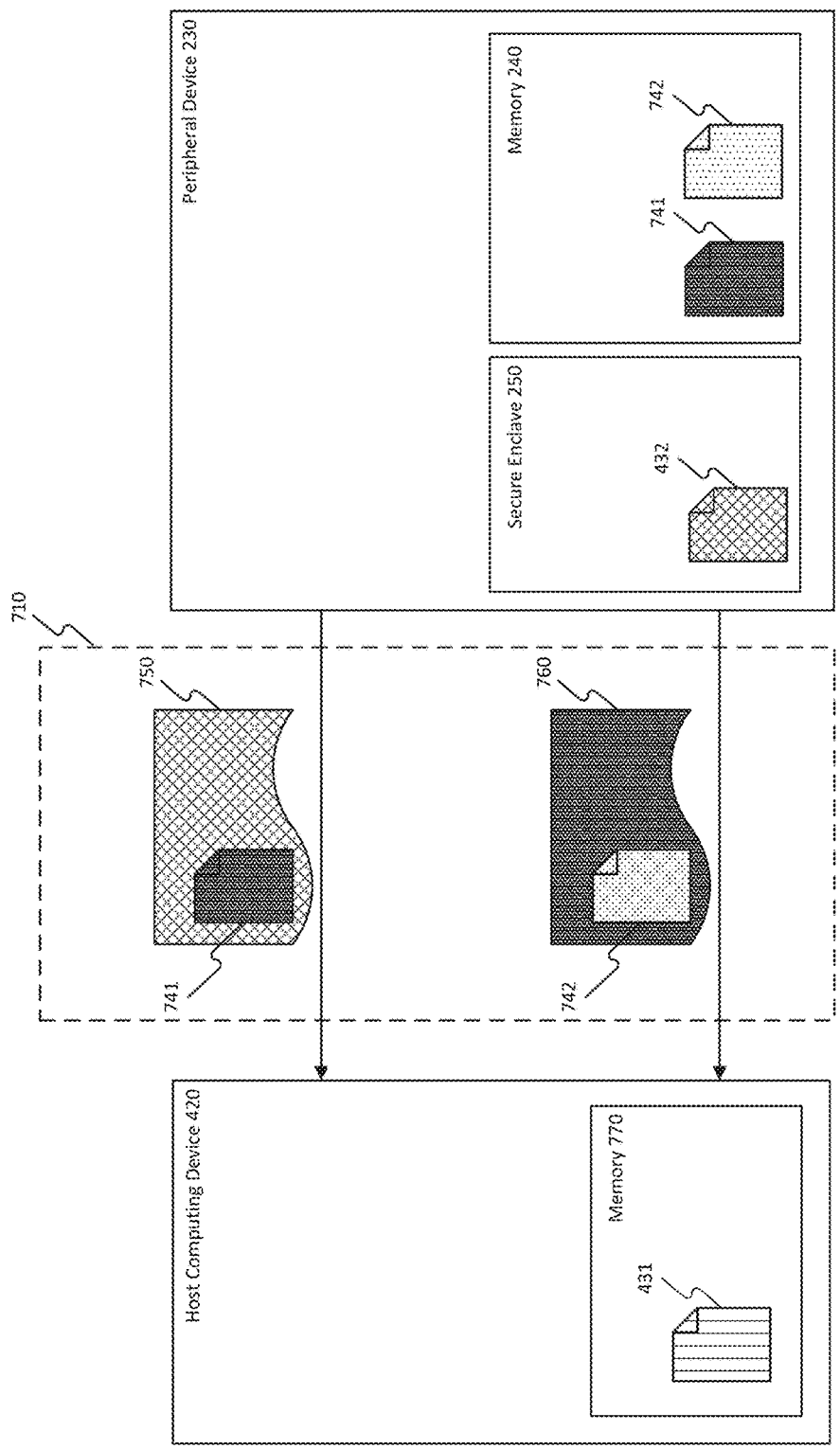

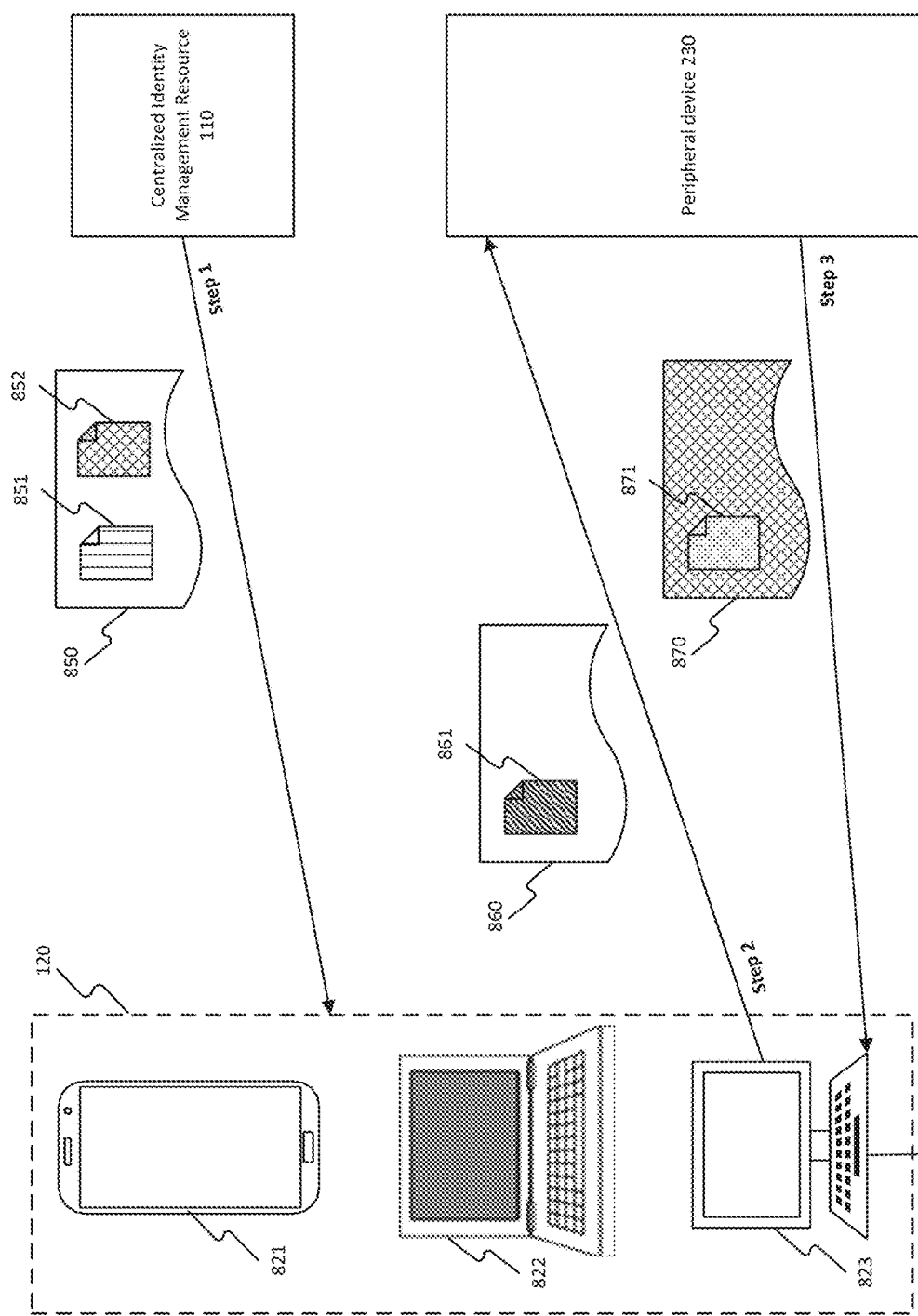

IDENTITY-BASED SECURITY LAYER FOR PERIPHERAL COMPUTING DEVICES

CLAIM FOR PRIORITY

This application is a continuation of U.S. Non-Provisional patent application Ser. No. 17/219,333, filed on Mar. 31, 2021, which is expressly incorporated herein by reference in its entirety.

TECHNICAL FIELD

This disclosure relates to secure communications between host and peripheral devices. In some embodiments, for example, this disclosure relates to systems and methods for encrypted communications between identifiable host and peripheral devices in order to avoid tampering of data communications between host and peripheral devices by malicious actors.

BACKGROUND

Applications executing on computing devices may rely on several peripheral devices to capture the state of the external environment. Such captured state data may include data from a fingerprint scan, facial recognition scan, and various other use cases, such as two-factor authentication or authorization used by applications executing on the computing devices. Computing devices receiving such captured data may not check the source's authenticity, resulting in potentially malicious actors presenting incorrect data.

The authenticity of a peripheral device source may be disguised by emulating a peripheral device in software. Further, the peripheral device's integrity can be compromised by physically tampering with the peripheral device to send incorrect data to computing devices.

Moreover, even if the peripheral device is not tampered with to provide incorrect data, the correct data transferred by a peripheral device may be intercepted by a third-party and used for inappropriate purposes. A secure communication channel is needed to send the data without any intervention by malicious actors.

Furthermore, even an authenticated peripheral device cannot guarantee the correctness of transferred data. An intruder may intercept and manipulate a data transmission to send incorrect data to the computing device and the applications executing on it. Such incorrect data may result in misbehavior of applications using the data as input and may further impact other data present on the computing device.

However, the interception of data from a peripheral device may be made secure by allowing a computing device to connect to only peripheral devices in proximity or integrated into the computing device. While such a restriction of communications to specific peripheral devices may solve the problem of the peripheral device source's authenticity, the source itself may be physically tampered with and replaced with the intruder's own hardware or software to intercept and manipulate data transmissions.

Additionally, a computing device may rely on multiple peripheral devices simultaneously for capturing the state data. For example, macOS-based computers authenticate users of devices by sending identity confirmation requests to multiple Apple™ devices across the Internet to capture user confirmation, making it difficult to control the data sources.

Thus, there are needs for technological solutions to manage peripheral device source authentication and the content shared by the peripheral device source. Such solutions would advantageously help prevent malicious actors from emulating the peripheral devices or intercepting the peripheral devices' data. Furthermore, there are technological needs to authenticate the integrity of peripheral devices and secure the communications between the peripheral devices and computing devices. Further technical improvements are described in the example embodiments below.

SUMMARY

Certain embodiments of the present disclosure relate to a peripheral device that is configured for communications with a host computing device. The peripheral device can include at least one processor configured to execute instructions to cause the peripheral device to perform operations to participate in a validation process with the host computing device. The operations can include receiving, from the host computing device, a second key that is part of a cryptographic key pair comprising a first key and the second key; encrypting, using the second key and as part of the validation process, data at the peripheral device; and sending the encrypted data to the host computing device; wherein the host computing device validates an identity of the peripheral device based on a decryption, using the first key, of the encrypted data.

According to some disclosed embodiments, the operations can further include participating in secure communications between the host computing device and the peripheral device conditional on a successful result of the validating.

According to some disclosed embodiments, the operations can further include participating in secure communications between a group of host computing devices and the peripheral device conditional on a successful result of the validating.

According to some disclosed embodiments, the operations can further include participating in a secure session between the host computing device and the peripheral device conditional on a successful result of the validating.

According to some disclosed embodiments, the operations can further include participating in secure sessions between a group of host computing devices and the peripheral device conditional on a successful result of the validating.

According to some disclosed embodiments, the operations can further include accessing a third key at the peripheral device, encrypting the third key using the second key, and sending the encrypted third key to the host computing device, wherein the host computing device is configured to decrypt the encrypted third key with the first key, yielding the third key, and to encrypt session traffic to the peripheral device using the third key.

According to some disclosed embodiments, session traffic from the peripheral device to the host computing device is encrypted by the peripheral device using the third key.

According to some disclosed embodiments, the validating is performed on a per-connection basis each time the peripheral device is connected to the host computing device.

According to some disclosed embodiments, the peripheral device stores the second key in a secure memory environment of the peripheral device comprising a memory and a processor, both of which are separate from, and operate independently from, a main memory and a main processor of the peripheral device.

According to some disclosed embodiments, the peripheral device is at least one of: a Universal Serial Bus device or a High-Definition Multimedia Interface device.

According to some disclosed embodiments, the operations can further include sending to the host computing device a success message that was generated conditional on the peripheral device having successfully received the second key.

According to some disclosed embodiments, the peripheral device stores multiple different keys of a same type as the second key, the multiple different keys enabling the peripheral device to be validated by a plurality of corresponding different host computing devices.

According to some disclosed embodiments, the data associated with the second key is a hash of the second key.

Certain embodiments of the present disclosure relate to a computer implemented method for validating potentially malicious or unauthorized peripheral devices. The method can include identifying, at a host computing device, a peripheral device; accessing, at the host computing device, a cryptographic key pair comprising a first key and a second key; storing, by the host computing device at a memory environment associated with the host computing device, the first key and data associated with the second key; providing the second key to the peripheral device, wherein the peripheral device stores the second key in a memory environment of the peripheral device; and validating, at the host computing device, an identity of the peripheral device based on a decryption, using the first key, of data that was encrypted by the peripheral device using the second key.

According to some disclosed embodiments, the method can further include sending, from the host computing device, an encrypted challenge to the peripheral device, and receiving, from the peripheral device, a response to the encrypted challenge, wherein the peripheral device decrypts the encrypted challenge using the second key.

According to some disclosed embodiments, the method can further include determining, at the host computing device, whether the response to the encrypted challenge is successful, and performing at least one of the following operations, conditional on the determination of whether the response to the encrypted challenge is successful: validating the peripheral device as a trusted device for connection with the host computing device, validating the peripheral device as a trusted device for a current session with the host computing device, allowing initialization of a session between the host computing device and the peripheral device, allowing session traffic to be exchanged between the host computing device and the peripheral device, denying initiation of a session between the host computing device and the peripheral device, or terminating a session between the host computing device and the peripheral device.

According to some disclosed embodiments, the method can further include initiating, conditional on the validation of the message being successful, a session between the peripheral device and the host computing device.

According to some disclosed embodiments, the method can further include validating the peripheral device conditional on the validation of the message being successful.

According to some disclosed embodiments, the method can further include accessing, by the host computing device, a new cryptographic key pair to replace the cryptographic key pair, the new cryptographic key pair comprising a new first key and a new second key.

According to some disclosed embodiments, the method can further include storing, by the host computing device, the new first key and data associated with the new second key, providing the new second key to the peripheral device, wherein the peripheral device is configured to store the new second key in the secure memory environment, receiving, at the host computing device, a new message from the peripheral device, validating, at the host computing device, the new message by attempting to decrypt the new message using the new first key, receiving a new encrypted third key from the peripheral device, the new third key having been encrypted by the peripheral device using the new second key, and encrypting, at the host computing device, new session traffic from the host computing device to the peripheral device using a decrypted version of the new encrypted third key.

Certain embodiments of the present disclosure relate to a non-transitory computer readable medium including instructions that are executable by at least one processor to perform operations for managing cryptographic keys needed for peripheral devices to securely communicate with host computing devices. The operations can include receiving, at a centralized identity management resource, a first key that is part of a cryptographic key pair comprising the first key and a second key; wherein the second key is stored at a peripheral device for use by the peripheral device in encrypting data; identifying a first host computing device that is permitted to engage in secure communications with the peripheral device; and making available the first key from the centralized identity management resource to the first host computing device to enable the first host computing device to decrypt the encrypted data.

According to some disclosed embodiments, the operations can further include associating the first key with an identity for the peripheral device.

According to some disclosed embodiments, the operations can further include validating the first host computing device before making available the first key.

According to some disclosed embodiments, the validating can further include authenticating the first host computing device.

According to some disclosed embodiments, the validating can further include determining that the first host computing device is actively connected to a network.

According to some disclosed embodiments, the first key is received at the centralized identity management resource as part of a registration process for the peripheral device.

According to some disclosed embodiments, the registration process can further include identifying a plurality of host computing devices to which the first key may be made available.

According to some disclosed embodiments, the operations can further include making available the first key from the centralized identity management resource to a plurality of host computing devices to enable the plurality of host computing devices to each decrypt the encrypted data.

According to some disclosed embodiments, making available the first key from the centralized identity management resource to the plurality of host computing devices is performed according to a security policy.

Certain embodiments of the present disclosure relate to a computer implemented method for securely communicating between host computing devices and peripheral devices. The method can include sending, from a first host computing device to a centralized identity management resource, a prompt indicating that the first host computing device seeks to engage in secure communications with a peripheral device; participating in a validation process with the centralized identity management resource; obtaining, conditional on a successful result of the validation process, access to a first key that is part of a cryptographic key pair comprising the first key and a second key; wherein the second key is stored at the peripheral device for use by the peripheral device in encrypting data; receiving the encrypted data from the peripheral device; and decrypting, using the first key, the encrypted data.

According to some disclosed embodiments, obtaining access to the first key can further include receiving the first key from the centralized identity management resource.

According to some disclosed embodiments, obtaining access to the first key can further include receiving the first key from a second host computing device to which the first key was stored in a distributed manner.

According to some disclosed embodiments, obtaining access to the first key can further include retrieving the first key from a secure enclave environment on the first host computing device.

According to some disclosed embodiments, securely communicating between host computing devices and peripheral devices can further include participating in a synchronization process with the centralized identity management resource, wherein the centralized identity management resource provides the first host computing device with a replacement key that replaces the first key.

According to some disclosed embodiments, the synchronization process can further include multiple host computing devices, including the first host computing device, receiving the replacement key.

According to some disclosed embodiments, the method can further include as part of the validation process, indicating to the centralized identity management resource a version of software on the first host computing device.

According to some disclosed embodiments, the method can further include as part of the validation process, providing to the centralized identity management resource authentication information.

According to some disclosed embodiments, the validation process is performed according to a policy implemented at the centralized identity management resource.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 7 shows an exemplary data communication session between a peripheral device and a host computing device, according to embodiments of the present disclosure.

FIG. 8A is a flow diagram of an exemplary peripheral device registration process using a centralized identity management resource, according to some embodiments of the present disclosure.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof may occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms, thus, cover both active forms, and passive forms, of sending and receiving.

Systems and methods consistent with the present disclosure are directed to secure communication with peripheral devices using cryptographic encryption keys. In some embodiments, the disclosed techniques include the management of communication sessions between multiple hosts and peripheral devices using a centralized management service. As described below, these secure communication management techniques with peripheral devices result in various technological improvements in the security and privacy of the data shared by users using peripheral devices connected to host computing devices.

Figure 1:
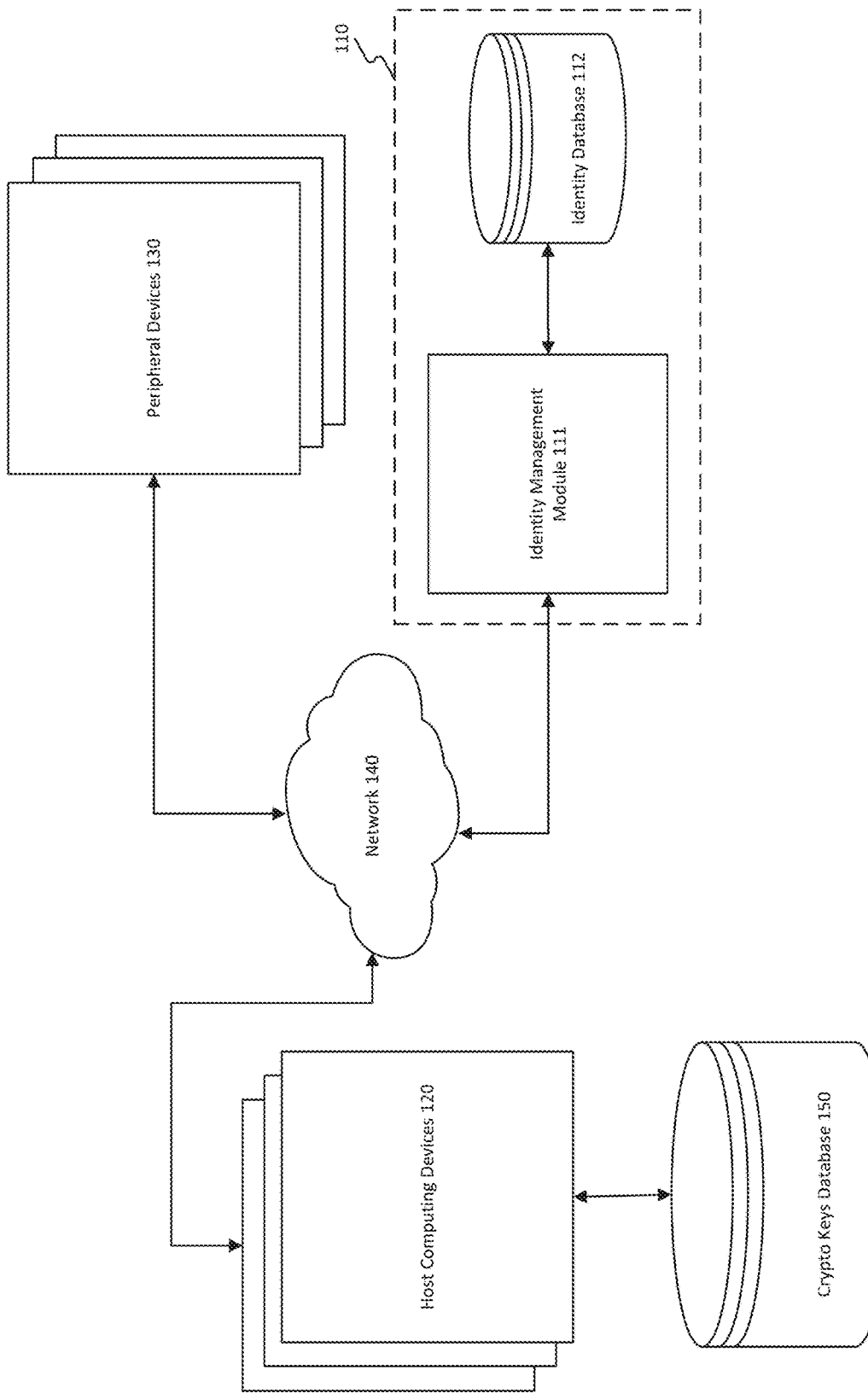
FIG. 1 is a block diagram showing various exemplary components of a system for secure communication between host computing devices and peripheral devices, according to some embodiments of the present disclosure.

FIG. 1 is a block diagram showing various exemplary components of a system 100 for secure communication between host computing devices 120 and peripheral devices 130, respectively, according to some embodiments of the present disclosure. System 100 components may also comprise a centralized identity management resource (CIMR) 110 to manage identities of host computing devices 120 and peripheral devices 130 involved in secure communication. The CIMR 110 may include identity management module 111 and identity database 112. In various embodiments, the identity database 112 may take several different forms. For example, identity database 112 may be an SQL database or NoSQL database, such as those developed by MICROSOFT™, REDIS, ORACLE™, CASSANDRA, MYSQL, various other types of databases, data returned by calling a web service, data returned by calling a computational function, sensor data, IoT devices, or various other data sources. Identity database 112 may store data that is used or generated during the operation of applications, such as identity management module 111. For example, if identity management module 111 is configured to generate encryption keys specific to certain devices, such as peripheral devices 130 and host computing devices 120 communicating with each other, identity database 112 may store the encryption keys specific to devices as identities of the devices. Similarly, if CIMR 110 is configured to provide a previously identified device's identity, identity management module 111 may retrieve previously generated encryption keys associated with a device and other related data stored in identity database 112. In some embodiments, identity database 112 may be fed data from an external source, or the external source (e.g., server, database, sensors, IoT devices, etc.) may be a replacement.

As illustrated in FIG. 1, host computing devices 120 and peripheral devices 130 may connect directly and interact with CIMR 110 over network 140. Host computing devices 120 may be a processor or a complete computing device, such as laptops, desktop computers, mobile devices, smart home appliances, IoT devices, etc. Host computing devices 120 may be used to interact with peripheral devices 130 or vice versa. A user may interact with host computing devices 120 directly or indirectly to retrieve or receive data from peripheral devices 130. For example, a user may indirectly interact with a first host computing device through a second host computing device to access data of a peripheral device connected to the first host computing device. A user's interaction with host computing devices 120 may also include interaction using a peripheral device of peripheral devices 130. For example, a user intending to interact with a host computing device using a USB keyboard peripheral device may need to prove their identity through a camera peripheral device connected to the host computing device. The camera peripheral device may capture the user's image and share it with the host computing device the user intends to interact with using the USB keyboard peripheral device. In another scenario, a different host computing device, such as a mobile device and its integrated camera peripheral device or fingerprint scan sensor peripheral device, may be used to capture user identity data and share it with the host computing device the user intends to interact with. A detailed description of host computing devices 120 is presented in connection with FIG. 3 and its corresponding description below.

Peripheral devices 130 may include devices externally connected to host computing devices 120 and provide information for applications running on host computing devices 120. In some embodiments, peripheral devices 130 may be internal components of host computing devices 120. Peripheral devices 130 may include USB connector-based devices connected externally to host computing devices 120. In some embodiments, the peripheral devices 130 may use different connectors such as USB-A, USB-C, Firewire, IEEE-1394, HDMI, or other serial or parallel bus connector technologies. Peripheral devices 130 may be integrated into host computing devices 120, for example, an integrated camera or fingerprint scan sensor of a laptop computer or mobile phone. Peripheral devices 130 integrated into host computing devices 120 may still be connected using a USB connector or other serial bus connectors listed above. A detailed description of the internal components of peripheral devices is provided in connection with FIG. 2 and its corresponding description below.

A user may securely communicate with host computing devices 120 using peripheral devices 130. Peripheral devices 130 may also automatically communicate securely with host computing devices 120 upon receiving a communication request. Host computing devices 120 may need to set up a secure communication channel for peripheral devices 130 to transmit data to host computing devices 120. In some embodiments, peripheral devices 130 may request CIMR 110 to set up a secure communication channel to transmit data to host computing devices 120. Peripheral devices 130 may coordinate with each other when communicating with host computing devices 120. For example, camera and fingerprint scan sensor peripheral devices of a mobile phone (e.g., a host computing device) may coordinate to deactivate themselves when the other peripheral device has securely transmitted user verification data to the mobile phone to unlock the device. Peripheral devices 130 coordinating to communicate with host computing devices 120 may in some share a common communication channel. A detailed description of setting up a secure communication channel is provided in connection with FIG. 4 and its description below.

Peripheral devices 130 may, for example, continuously stream communication data (e.g., session data, file data, etc.) to host computing devices 120. In some embodiments, host computing devices 120 may manage the time and amount of communication data using communication commands. In some embodiments, CIMR 110 may manage the communication of peripheral devices 130 with host computing devices 120. In some embodiments, CIMR 110 may also review the data transmitted by peripheral devices 130 before sending data to host computing devices 120. CIMR 110 may record the data transmitted by peripheral devices 130 to host computing devices 120 and may utilize the recorded data for generating usage analytics.

Peripheral devices 130 may communicate with host computing devices 120 when an application running on host computing devices 120 needs certain information. In some embodiments, peripheral devices 130 may automatically communicate with host computing devices 120. For example, an application executing on a host computing device of host computing devices 120 that needs recognition of a person may cause a camera peripheral device integrated into the host computing device, or connected externally, to automatically turn on and capture the person's image. In some embodiments, host computing devices 120 may request data from peripheral devices 130 independent of applications running on host computing devices 120. Host computing devices 120 may request data from peripheral device 230 for a set period or stream continuously until a set trigger event. System 100 may in some situations need to maintain a communication session with peripheral devices 130 and host computing devices 120 to communicate. A detailed description of managing a communication session is provided in connection with FIGS. 7 and 9 and their descriptions below.

Figure 2:
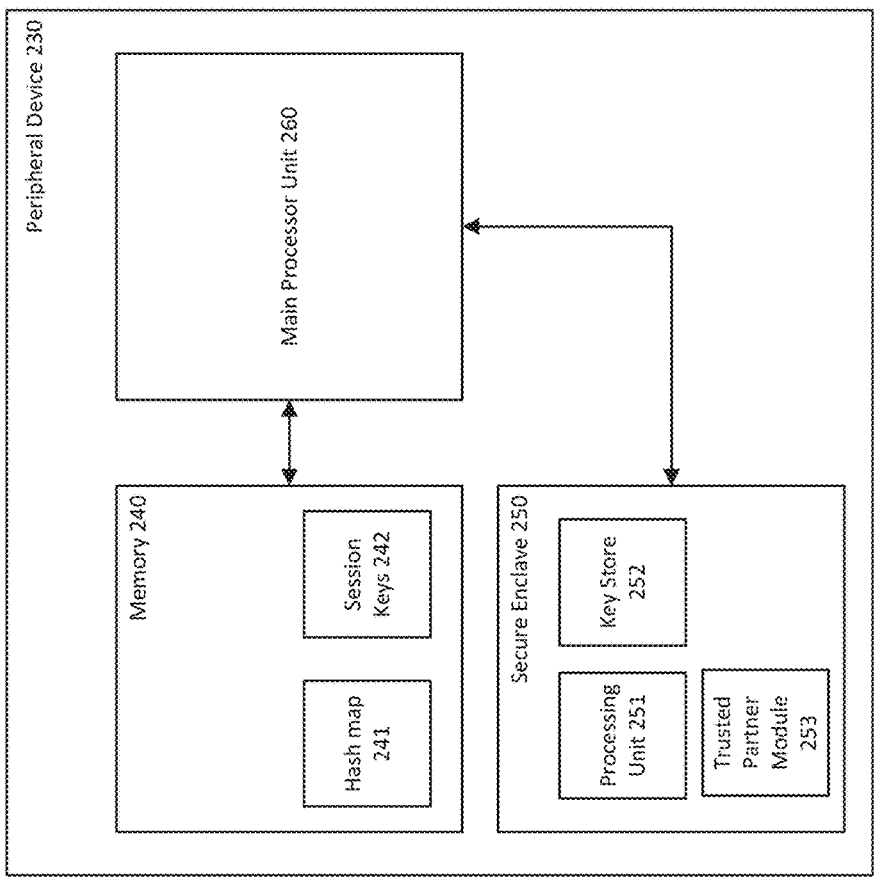
FIG. 2 shows an exemplary peripheral device, according to some embodiments of the present disclosure.

Peripheral devices 130 may only communicate with trusted host computing devices, which may be a subset of host computing devices 120. Peripheral devices 130 may manage the trusted devices list in its memory (e.g., memory 240 as shown in FIG. 2 below). In some embodiments, CIMR 110 and host computing devices 120 may manage a separate trusted devices list for each of the peripheral devices 130. Host computing devices 120 may populate such lists through a registration process. In some embodiments, peripheral devices 130 and host computing devices 120 may conduct an additional validation step to maintain the trusted devices list. A detailed description of registration and validation of devices is provided in connection with FIGS. 5 and 6 and their descriptions below.

Host computing devices 120 may include devices for running applications and connecting with peripheral devices 130 and other host computing devices 120. Host computing devices 120 may include laptops, desktop computers, smartphones, and computation devices of other forms (e.g., smart home appliances, IoT devices, etc.). Host computing devices 120 may work in tandem to share data received from peripheral devices 130 in some embodiments. Host computing devices 120 may transmit data requests to peripheral devices 130. In some embodiments, a host computing device of host computing devices 120 may broadcast data requests to peripheral devices 130. Host computing devices 120 may directly send their data requests to peripheral devices 130 or indirectly through other host computing devices. For example, a desktop computer (e.g., first host computing device) needing user verification data may send a verification data request to a mobile phone (e.g., second host computing device) operated by the user.

Host computing devices 120 may send data requests to peripheral device 230 by setting up a secure communication channel. A secure communication channel setup may include exchanging cryptographic keys between host computing devices 120 and peripheral device 230. Host computing devices 120 may access cryptographic keys from crypto keys database 150 for setting up a secure communication channel. In some embodiments, CIMR 110 may provide the cryptographic keys for secure communication channel setup. Host computing devices 120 may store cryptographic keys provided by CIMR 110 in crypto keys database 150. Host computing devices 120 may set up a secure communication channel upon detecting a new peripheral device in peripheral devices 130. A new peripheral device may broadcast its presence to host computing devices 120, triggering secure communication channel setup. In some embodiments, CIMR 110 may forward the presence of a new peripheral device to host computing devices 120. In some embodiments, host computing devices 120 may set up a secure communication channel when an application running on a host computing device requests for data available through peripheral devices 130.

Host computing devices 120 may forward data requests from applications to peripheral devices 130 over network 140. The requests for information in identity database 112 may also optionally be received via network 140. Network 140 may take various forms. For example, network 140 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 140 may include an on-premises (e.g., LAN) network, while in other embodiments, network 140 may include a virtualized (e.g., AWS™, Azure™, IBM Cloud™, etc.) network. Further, network 140 may in some embodiments be a hybrid on-premises and virtualized network, including components of both types of network architecture.

FIG. 2 shows an exemplary peripheral device 230 of peripheral devices 130, according to some embodiments of the present disclosure. Peripheral device 230 may include components such as memory 240, secure enclave 250, and main processor unit 260. Peripheral device 230 may use memory 240 to store data and communication requests sent by host computing devices 120 and other data sources. Memory 240 may be implemented in several ways. For example, in various embodiments, memory 240 may be implemented in Dynamic RAM (DRAM), Static RAM (SRAM), Z-RAM, Advanced-RAM (A-RAM), Synchronous Dynamic RAM (SDRAM), Double Data Rate SDRAM (DDR SDRAM), Graphics DDR SDRAM (GDDR SDRAM), Flash, or other types of memory.

Peripheral device 230 may secure metadata required for storing data in a separate location such as secure enclave 250. Secure enclave 250 may contain hardware components, including processing unit 251, to allow secure enclave 250 to function independently of the rest of the peripheral device 230. Secure enclave 250 may be used to store metadata such as cryptographic keys for secure encrypted communication between peripheral device 230 and host computing devices (e.g., host computing devices 120 of FIG. 1). Secure enclave 250 may store the cryptographic keys in key store 252. Secure enclave 250 may also include Trusted Partner Module (TPM) 253 that helps determine which host computing device can communicate with peripheral device 230. In some embodiments, key store 252 and TPM 253 may be part of processing unit 251. Secure enclave 250 may secure the metadata in key store 252 by disallowing emulation of a peripheral device 230. Secure enclave 250 disallows emulation by restricting an intruder from copying content and functionality stored in secure enclave 250. Secure enclave 250 may offer additional data security by including a tamper-proof processing unit 251 and/or the whole secure enclave 250.

Processing unit 251 may be a specialized crypto-processor chip used to manage cryptographic keys stored in secure enclave 250. Processing unit 251 may generate cryptographic keys to encrypt data in a communication session initialized by peripheral device 230. In some embodiments, processing unit 251 may be used to encrypt data generated or captured by peripheral device 230 using the cryptographic keys stored in key store 252. A detailed description of the method for initializing a secure communication session is provided in connection with FIG. 13 and its description below.

Key store 252 may include cryptographic keys sent by other devices (e.g., host computing devices 120) to set up a secure communication channel with peripheral device 230. Key store 252 may also include cryptographic keys generated by peripheral device 230 for initializing a secure communication session with host computing devices (e.g., host computing devices 120). Cryptographic keys stored in key store 252 may include keys to decrypt a message received by peripheral device 230 and encrypt data sent to host computing devices 120.

TPM 253 may include software tools to secure peripheral device 230 by limiting commands and data processed by processing unit 251. TPM 253 may reside in the processing unit 251 and may be loaded upon accessing secure enclave 250. Peripheral device 230 may rely on secure enclave 250 and in turn on TPM 253 to determine when and which data requests can be processed by peripheral device 230. Peripheral device 230 may communicate with only trusted devices that are among a subset of host computing devices 120. Peripheral device 230 may utilize TPM 253 to determine the list of trusted devices in the subset of host computing devices 120.

Main processing unit 260 of peripheral device 230 may be used for executing any software functions in peripheral device 230. Software functions performed by peripheral device 230, as further discussed below, may include data capturing and data processing functions. For example, main processing unit 260 may be used to encrypt data before sending it to a requesting device, such as host computing devices 120 or decrypting data received by peripheral device 230. Encryption of data sent to host computing devices 120 and decryption of data received from host computing devices 120 are described in detail in connection with FIG. 7 and its description below.

Main processor unit 260 may be a general processor used to communicate with secure enclave 250 during a secure communication session between peripheral device 230 and host computing device of host computing devices 120. Main processor unit 260 may be listed as a trusted source to communicate with secure enclave 250. Main processor unit 260 may communicate with secure enclave 250 to retrieve information and store it in memory 240 before processing and sharing it with a host computing device.

Memory 240 may include both data to be shared with other devices and metadata used to manage data communication with the other devices (e.g., peripheral devices 130, host computing devices 120). Memory 240 may utilize hash map 241 and session keys 242 to manage the data communication with other devices (e.g., host computing devices 120). Peripheral device 230 may use hash map 241 to manage the trusted devices list of host computing devices subset to communicate with. The hash map 241 may be accessed by TPM 253 of secure enclave 250 to determine the list of trusted devices. Hash map 241 may include a hash of the encryption keys present in key store 252 of secure enclave 250. In some embodiments, hash map 241 may also include a hash of keys in session keys 242. Peripheral device 230 may look up keys in hash map 241 to request secure enclave 250 to initiate a communication session. Memory 240 may also include session keys 242 to encrypt data shared with other devices (e.g., host computing devices 120). Secure enclave 250 may generate keys in session keys 242. In some embodiments, session keys 242 may be populated with keys from key store 252 when a peripheral device 230 receives a session initiation request. Hash map 241 may include pointers to a memory or file location of session keys 242 stored in peripheral device 230.

Figure 3:
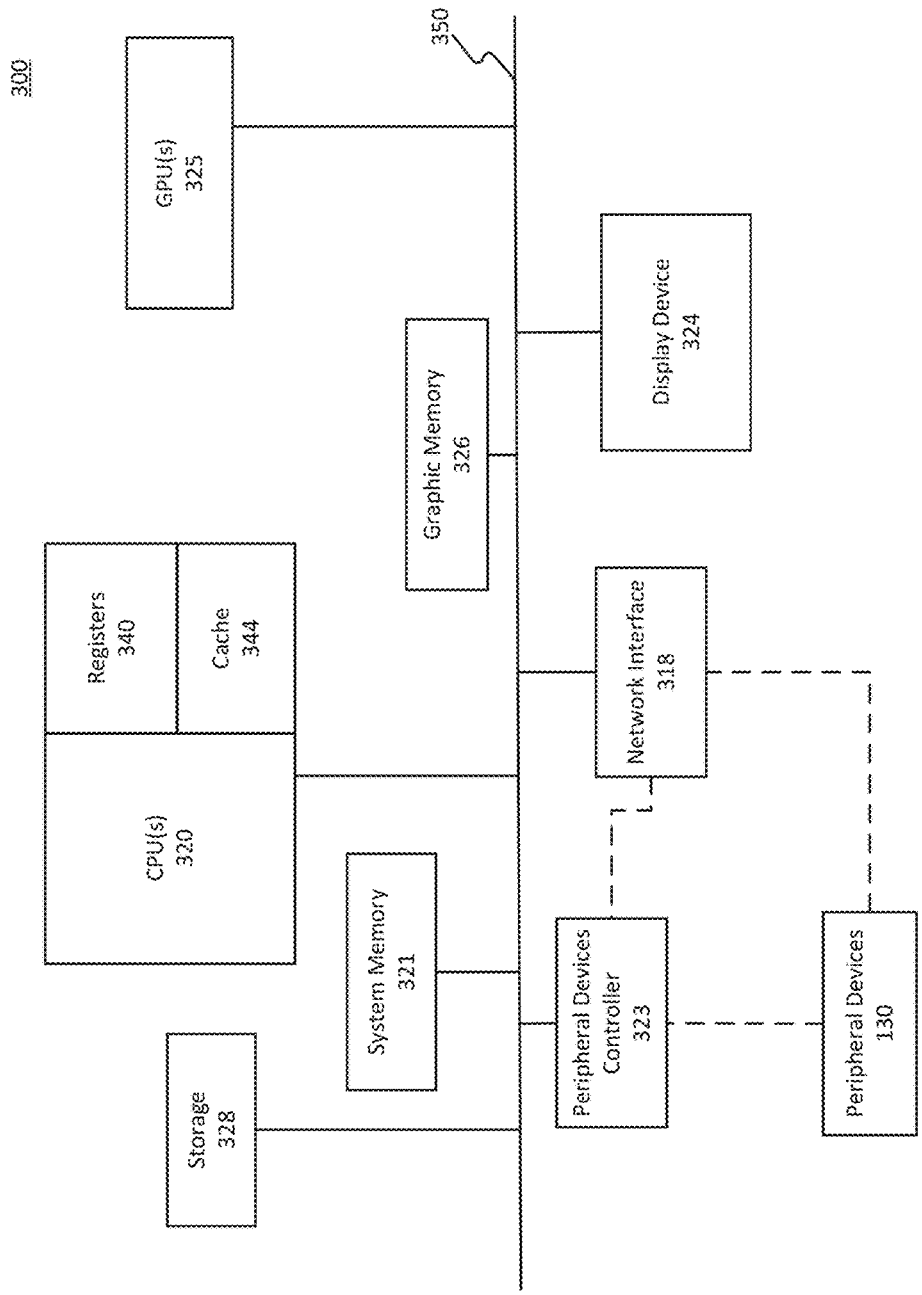
FIG. 3 is a block diagram of an exemplary computing device used to implement system of FIG. 1, according to some embodiments of the present disclosure.

FIG. 3 is a block diagram of an exemplary computing device 300 used to implement system 100, according to some embodiments of the present disclosure. In some embodiments, computing device 300 may be a specialized server providing the functionality described herein. In some embodiments, components of system 100, such as centralized identity management resource 110 or host computing devices 120 of FIG. 1, may be implemented using the computing device 300 or multiple computing devices 300 operating in parallel. Further, the computing device 300 may be a second device providing the functionality described herein or receiving information from a server to provide at least some of the described functionality. Moreover, the computing device 300 may be an additional device or devices that store or provide data consistent with embodiments of the present disclosure. In some embodiments, computing device 300 may be a virtualized computing device such as a virtual machine, multiple virtual machines, a container instance, or a hypervisor. Computing device 300 may include one or more virtual machines or containers and implementing various components of system 100. For example, host computing devices 120 and CIMR 110 may be executing on two separate virtual machines running atop computing device 300.

Computing device 300 may include one or more central processing units (CPUs) 320 and a system memory 321. Computing device 300 may also include one or more graphics processing units (GPUs) 325 and graphic memory 326. In some embodiments, computing device 300 may be a headless computing device that does not include GPU(s) 325 or graphic memory 326.

CPUs 320 may be single or multiple microprocessors, field-programmable gate arrays, or digital signal processors capable of executing sets of instructions stored in a memory (e.g., system memory 321), a cache (e.g., cache 341), or a register (e.g., one of registers 340). CPUs 320 may contain one or more registers (e.g., registers 340) for storing various types of data including, inter alia, data, instructions, floating-point values, conditional values, memory addresses for locations in memory (e.g., system memory 321 or graphic memory 326), pointers and counters. CPU registers 340 may include special-purpose registers used to store data associated with executing instructions such as an instruction pointer, an instruction counter, or a memory stack pointer. System memory 321 may include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 321 may be one or more memory chips capable of storing data and allowing direct access by CPUs 320. System memory 321 may be any type of random-access memory (RAM) or other available memory chip capable of operating as described herein.

CPUs 320 may communicate with system memory 321 via a system interface 350, sometimes referred to as a bus. In embodiments that include GPUs 325, GPUs 325 may be any type of specialized circuitry that may manipulate and alter memory (e.g., graphic memory 326) to provide or accelerate images' creation. GPUs 325 may have a highly parallel structure optimized for processing large, parallel blocks of graphical data more efficiently than general-purpose CPUs 320. Furthermore, a chipset of a special purpose processing unit or a co-processor may include the GPUs 325 functionality.

Furthermore, computing device 300 may include network interface 318 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 318 may comprise a built-in network adapter, network interface card, PCMCIA network card, card bus network adapter, wireless network adapter, USB network adapter, modem, or any other device suitable for interfacing computing device 300 to any type of network capable of communication and performing the operations described herein.

CPUs 320 may execute programming instructions stored in system memory 321 or other memory, operate on data stored in memory (e.g., system memory 321), and communicate with GPUs 325 through the system interface 350, which bridges communication between the various components of the computing device 300. In some embodiments, CPUs 320, GPUs 325, system interface 350, or any combination thereof, are integrated into a single chipset or processing unit. GPUs 325 may execute sets of instructions stored in memory (e.g., system memory 321), to manipulate graphical data stored in system memory 321 or graphic memory 326. For example, CPUs 320 may provide instructions to GPUs 325, and GPUs 325 may process the instructions to render graphics data stored in the graphic memory 326. Graphic memory 326 may be any memory space accessible by GPUs 325, including local memory, system memory, on-chip memories, and hard disk. GPUs 325 may enable displaying graphical data stored in graphic memory 326 on display device 324 or process graphical information and provide that information to connected devices through network interface 318 or peripheral devices 130.

Computing device 300 may connect to a display device 324 and peripheral devices 130 (e.g., a keyboard, a mouse, or a pointing device) connected to peripheral device controller 323. Peripheral device controller 323 may communicate with the other components of computing device 300 via system interface 350. Peripheral device controller 323 may be a hub for connecting multiple peripheral devices 130. For example, peripheral devices controller 323 may be a USB hub to connected USB connector based peripheral devices of peripheral devices 130. In some embodiments, peripheral devices 130 may also connect to computing devices 130 using network interface 318. Peripheral devices controller 323 may connect with network interface 318 to retrieve and parse the data shared by peripheral devices 130 sent over network 140 (as shown in FIG. 1) to network interface 318 of computing device 300. In some embodiments, CPUs 320 may parse the data received from peripheral devices 130 via network interface 318. Peripheral devices 130 may communicate with computing device 300 via network interface 318 when they are physically connected to other host computing devices of host computing devices 120.

CPUs 320 may also communicate with system memory 321 and other devices in manners other than through system interface 350, such as through serial communication or direct point-to-point communication. Similarly, GPUs 325 may communicate with graphic memory 326 and other devices in ways other than system interface 350. In addition to receiving input, CPUs 320 may provide output via peripheral devices 130 (e.g., through a printer, speakers, bone conduction, or other output devices). Peripheral devices controller 323 may be an I/O controller within CPUs 320 or a separate chipset.

Computing device 300 may also include storage 328 to store data received from peripheral devices 130. Storage 328 may also include information accessed from CIMR 110 (as shown in FIG. 1). Storage 328 may include a file storage and a database and accessed using CPUs 320. CPUs 320 may move data in system memory 321 to storage 328 at regular intervals or vice versa. Storage 328 may include a cloud storage, such as AMAZON™ S3, Azure™ Storage, GOOGLE™ Cloud Storage accessible via network 140 (as shown in FIG. 1). Storage 328 may be used to implement a database to store metadata needed for secure communication between host computing devices 120 and peripheral devices 130. For example, storage 328 may include identity database 112 or crypto keys database 150.

Figure 4:
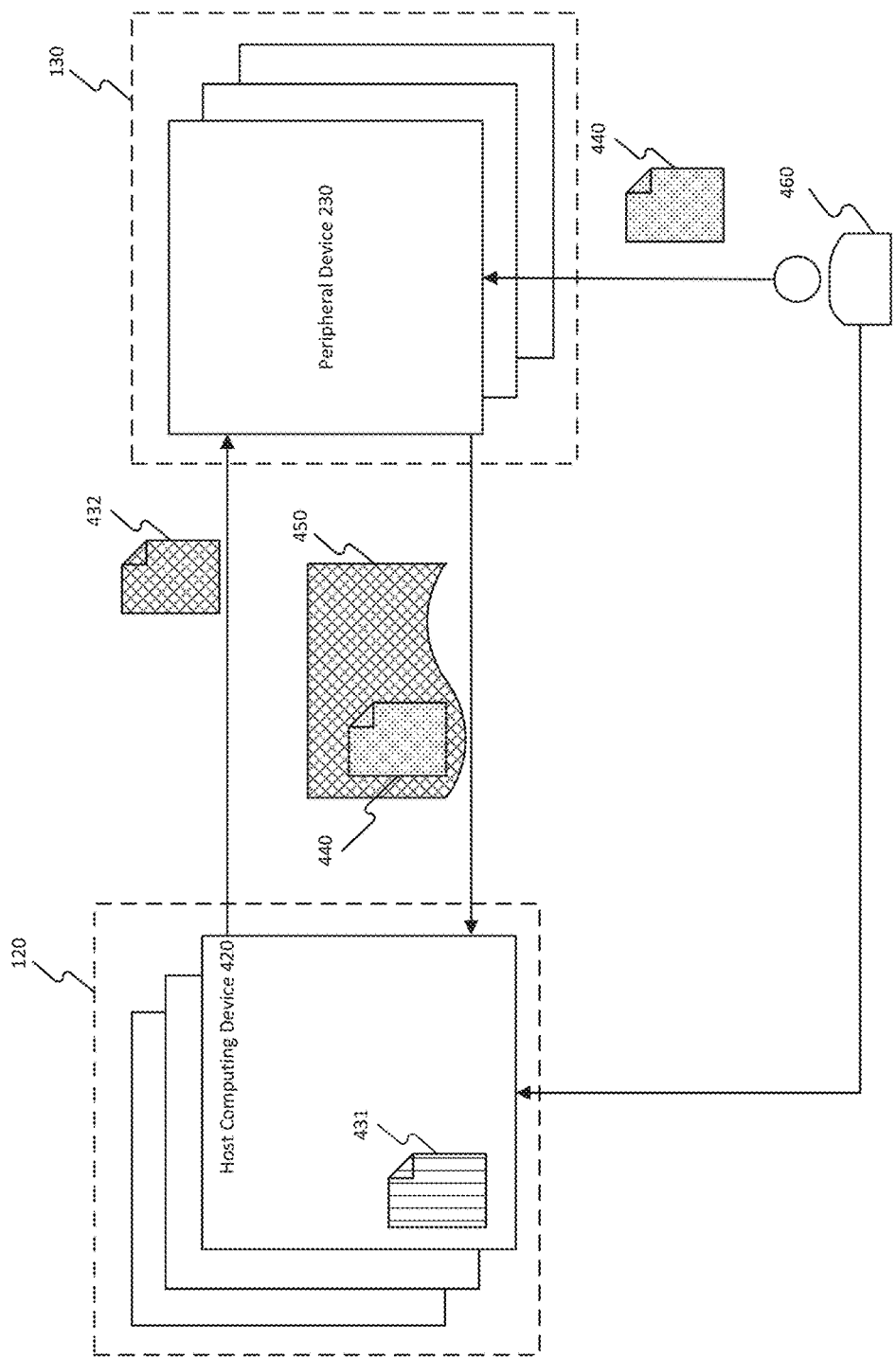
FIG. 4 shows an exemplary secure data communication channel set up for communication between peripheral devices and host computing devices, according to embodiments of current disclosure.

FIG. 4 shows an exemplary secure data communication channel set up for communication between peripheral device 230 of peripheral devices 130 and host computing device 420 of host computing devices 120 according to embodiments of current disclosure. Host computing device 420 may request peripheral device 230 to provide data securely by encrypting data using a cryptographic key. A request for secure data communication channel setup from host computing device 420 may include transmitting a cryptographic key pair to peripheral device 230. Host computing device 420 may generate a pair of cryptographic keys, first key 431 and second key 432, before requesting to set up a secure data communication channel to peripheral device 230. In some embodiments, host computing device 420 may share a previously generated cryptographic key pair with peripheral device 230. In some embodiments, host computing device 420 may request system 100 to provide a new copy of cryptographic key pair 431-432 to replace its local copy. CIMR 110 (as shown in FIG. 1) may help generate the latest version of the cryptographic key pair to replace the existing key pair. Host computing device 420 may share a hash of a cryptographic key shared earlier, such as during a registration of peripheral device 230 described in connection with FIG. 5 and its description below.

Host computing device 420 may generate multiple sets of cryptographic key pairs to share a different key with each peripheral device (e.g., peripheral device 230) of peripheral devices 130. In some embodiments, host computing device 420 may share the same key (e.g., second key 432) with several peripheral devices (e.g., peripheral devices 130). Host computing device 420 may share the same key with multiple peripheral devices when the peripheral devices coordinate and share related data. In some embodiments, a set of peripheral devices (e.g., peripheral devices 130) may share the same key when the same host computing device processes all their data together (e.g., host computing device 420). For example, a host computing device that needs to validate a user's identity (e.g., user 460) of the host computing device may activate multiple identification mechanisms such as face and fingerprint recognition. The host computing device may request a secure data communication channel setup sent to camera and fingerprint scan sensor peripheral devices with the same cryptographic encryption key as an input parameter to validate the user.

A secure communication channel setup request may be made by host computing device 420 for future communication sessions between peripheral device 230 and itself. A secure communication channel setup may need to occur only once between each host computing device (e.g., host computing device 420) and peripheral device (e.g., peripheral device 230). In some embodiments, the secure communication channel may need to re-setup at regular intervals or after a certain time delay since the last communication session between host computing device 420 and peripheral device 230.

Host computing device 420 may generate cryptographic key pair (e.g., first key 431, second key 432) before it or applications running on it need data from peripheral device 230. In some embodiments, host computing device 420 may utilize a previously generated key for requesting data in encrypted format from peripheral device 230. Host computing device 420 may regularly refresh the cryptographic key pairs associated with peripheral devices (e.g., peripheral devices 130). Host computing device 420 may generate and refresh cryptographic key pair 431-432 at regular intervals for security purposes. For example, a host computing device (e.g., host computing device 420) may refresh cryptographic keys (e.g., cryptographic key pair 431-432) after a timeout period to avoid an intruder using a previously generated key for communicating with the host computing device 420. In some embodiments, host computing device 420 may generate cryptographic key pair 431-432 upon receiving an external event such as a request from user 460 or when an event is triggered by a software application or a hardware update. A separate centralized service such as CIMR 110 may manage the generation of cryptographic key pair, i.e., first key 431 and second key 432, for securely communicating with peripheral device 230. A detailed description of centralized management service is provided in connection with FIG. 9 and its description below.

Host computing device 420 may share second key 432 of a cryptographic key pair with peripheral device 230 to request data in encrypted format from peripheral device 230. In some embodiments, host computing device 420 may share second key 432 with peripheral device 230 over network 140. Peripheral device 230 connected over network 140 may be present on a cloud network or connected to an on-premises server.

In some embodiments, peripheral device 230 may be connected to host computing device 420 using a USB-A/C or firewire (IEEE 1394) or HDMI or other serial bus standards connectors. Peripheral device 230 may also be connected to host computing device 420 using a wireless protocol such as Bluetooth, Apple Airplay, 802.11 b/g/n/ac, etc.

Host computing device 420 may share second key 432 with peripheral device 230 upon receiving a connection request from peripheral device 230 or when host computing device 420 establishes a connection with peripheral device 230. For example, when connected to a host computing device, such as a laptop, a USB peripheral device may send a connection request to the host computing device, causing the host computing device to set up a secure communication channel. In another scenario, the laptop establishing a connection with Bluetooth peripheral device by successful pairing may send the request for a secure communication channel set up to the Bluetooth peripheral device.

Peripheral device 230 upon receipt of second key 432 may begin securely communicating by encrypting data and sending it to host computing device 420. In some embodiments, peripheral device 230 may acknowledge second key 232 before securely communicating data with host computing device 420. Peripheral device 230 may encrypt data using second key 432. In some embodiments, host computing device 420 may share additional information indicating the type of data, amount of data, time of encryption, etc., along with the encrypted data. Peripheral device 230 upon receipt of second key 432 may begin capturing and encrypting data 440. Peripheral device 230 may capture data 440 from a surrounding environment or by user 460's interaction with peripheral device 230. For example, peripheral device 230 may be a sensor capturing temperature or air pressure of the surrounding environment or a fingerprint scanner interacted by the user 460 to provide fingerprints. Peripheral device 230 may capture data 440 automatically or capturing data 440 when initiated by user 460. For example, peripheral device 230 may be a camera that automatically captures at regular intervals or when it detects a human being in its field of view. In another scenario, peripheral device 230 may be a keyboard waiting to capture keystrokes made by user 460. Peripheral device 230 may capture data from another data source over network 140. The other data source providing data 440 to peripheral device 230 may be present on a cloud service, such as AMAZON™ AWS, MICROSOFT™ Azure, GOOGLE™ Cloud, and accessible over the Internet.

Peripheral device 230 upon capturing data 440 may encrypt it using second key 432. Peripheral device 230 may capture a certain amount of data 440 before beginning the encryption process. For example, a camera peripheral device captures a minimum of three seconds of video before encrypting the captured video data. The amount of data to capture may be determined based on peripheral device capabilities. In some embodiments, host computing device 420 may share data capture requirements used with peripheral device 230 along with second key 432.

Peripheral device 230 upon encrypting data 440 may send encrypted data packet 450 to host computing device 420. In some embodiments, peripheral device 230 may continuously stream captured and encrypted data 440 to host computing device 420. Communication parameters, such as data transmission time intervals and the amount of data to encrypt, may depend on peripheral device 230 capabilities. In some embodiments, communication parameters may be configurable by host computing device 420. Host computing device 420 may provide communication parameters configuration as additional information sent to peripheral device 230 along with second key 432 to set up a secure communication channel. Host computing devices 120 may revise communication parameters during a communication session or at the beginning of each communication session using the secure communication channel.

Host computing device 420 upon receipt of encrypted data packet 450 may decrypt it using first key 431. In some embodiments, successful decryption of first data packet 450 may result in the completion of secure communication channel setup and registration of peripheral device 230 for future communication with host computing device 420. Registration of a peripheral device is described in detail in connection with FIG. 5 and its description below.

Peripheral device 230 may continuously send encrypted data packets (e.g., data packet 450) to host computing device 420 upon receiving a request for secure communication channel setup. Peripheral device 230 may stop sending encrypted data packets upon disconnecting the peripheral device 230 from host computing device 420. For example, peripheral device 230 may be a keyboard that stops sending the captured user keystrokes when disconnected from host computing device 420. In some embodiments, peripheral device 230 may stop transmitting encrypted data packets upon receiving a stop command from host computing device 420.

Peripheral device 230 may utilize trusted partner module 253 of secure enclave 250 to store the second key 432 for future communications with host computing device 420. A detailed description of second key 432's usage for multiple communication sessions is provided in connection with FIG. 7 and its description below. Peripheral device 230 may limit the use of second key 432 to establish a connection with host computing device 420. Peripheral device 230 may use a different cryptographic key to encrypt and share data with host computing device 420. Usage of multiple cryptographic keys to establish a secure connection session between host computing device 420 and peripheral device 230 and communication over the established secure communication channel is described in detail in connection with FIGS. 7 and 8 and their descriptions below.

Figure 5:
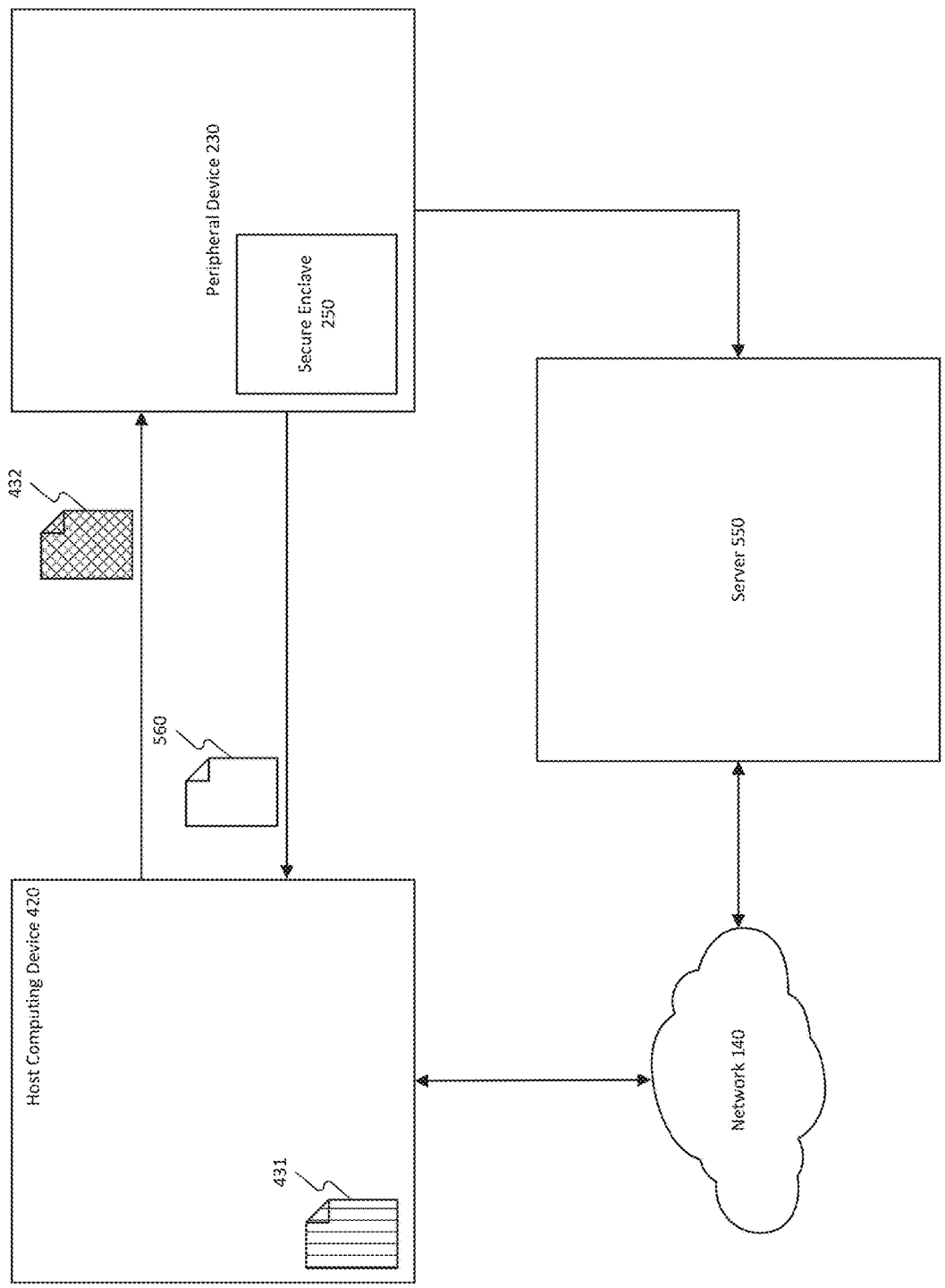
FIG. 5 shows an exemplary registration process of a peripheral device with a host computing device, according to some embodiments of the present disclosure.

FIG. 5 shows an exemplary registration of peripheral device 230 with host computing device 420, according to some embodiments of the present disclosure. Host computing device 420 may communicate only with a registered peripheral device 230. Peripheral device 230 may place similar restrictions when communicating with other devices (e.g., host computing devices 120). In some embodiments, a third-party device, such as server 550, may request host computing device 420 to register peripheral device 230 for it to access data (e.g., data 440 of FIG. 4) captured by peripheral device 230. Host computing device 420 upon registering peripheral device 230 on behalf of the server 550, may receive data from peripheral device 230 and share it with server 550. In some embodiments, server 550 may directly receive data from peripheral device 230. Host computing device 420 may register server 550 with peripheral device 230 for server 550 to receive data directly from peripheral device 230. In some embodiments, peripheral device 230 may communicate simultaneously with host computing device 420 and server 550. Peripheral device 230 may send data to all registered devices (e.g., host computing device 420 and server 550) whose identifiers are shared as part of a registration request. In some embodiments, there may be no registration process. Peripheral device 230 may communicate with the only physically connected host computing device (e.g., host computing device 420).

Host computing device 420 may register peripheral device 230 by generating and sharing with peripheral device 230 a cryptographic key pair first key 431 and second key 432. Peripheral device 230 registration may be part of a secure communication channel setup described in connection with FIG. 4 and its description above. In some embodiments, host computing device 420 may need to register peripheral device 230 before setting up a secure communication channel with peripheral device 230.

Host computing device 420 may store first key 431 and send second key 432 to peripheral device 230. In some embodiments, host computing device 420 may associate a unique identifier of peripheral device 230 with the stored first key 431. Unique identifiers may include peripheral device 230 network IP address, MAC address, serial number, or a combination of one or more of the listed identifiers. Host computing device 420 may need to include a registration request along with the second key 432 to register peripheral device 230. In some embodiments, the registration request may be encrypted using first key 431.

Peripheral device 230 may register host computing device 420 by storing second key 432. In some embodiments, peripheral device 230 may save the second key 432 in a secure enclave 250. Peripheral device 230 may associate second key 432 with a unique identifier of host computing device 420. Unique identifiers may include host computing device 420 network IP address, MAC address, device serial number, or a combination of one or more of the listed identifiers. Peripheral device 230 may register host computing device 420 by parsing the included registration request, which may include the unique identifier of host computing device 420. Peripheral device 230 may parse the registration request by decrypting the registration request using second key 432.

Peripheral device 230 may send a registration confirmation message 560 to host computing device 420. Host computing device 420 may register peripheral device 230 upon receiving registration confirmation message 560 to conduct further communication with peripheral device 230. Host computing device 420 may check for any error messages in the registration confirmation message 560. If the registration confirmation message 560 includes any error codes, then host computing device 420 may abort registration of peripheral device 230. Host computing device 420 may forward registration confirmation message 560 to server 550 for server 550 to register peripheral device 230 as a trusted data source. In some embodiments, registration confirmation message 560 may be encrypted using second key 432. Registration confirmation message 560 may include decrypted content sent to peripheral device encrypted using first key 431. In some embodiments, peripheral device 230 may broadcast registration confirmation message 560, allowing all devices (e.g., host computing device 420, server 550) capable of decrypting registration confirmation message 560 to register peripheral device 230.

Figure 6:
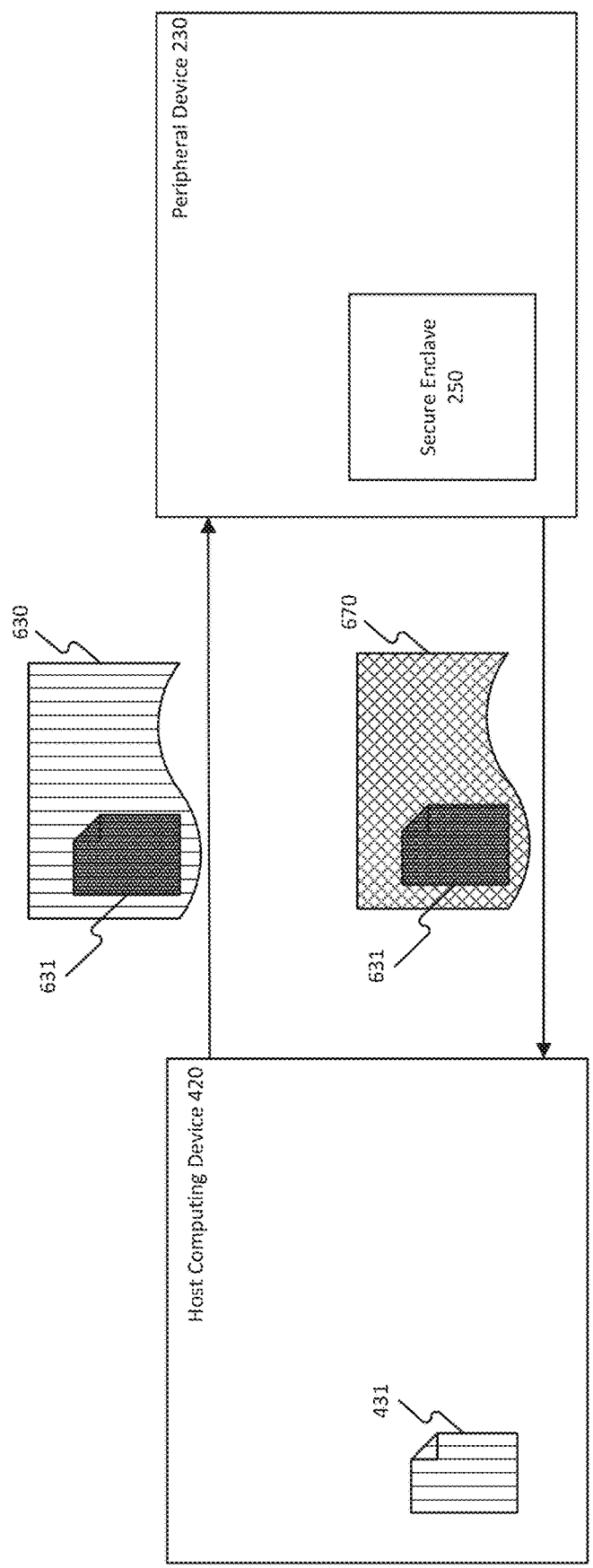
FIG. 6 shows an exemplary validation process of a peripheral device and a host computing device, according to some embodiments of the present disclosure.

FIG. 6 shows an exemplary validation process of peripheral device 230 and host computing device 420, according to some embodiments of the present disclosure. System 100 may validate host computing device 420 and peripheral device 230, or host computing device 420 and peripheral device 230 may validate each other before a communication session between them. In some embodiments, registration of a peripheral device 230 may result in automatic validation of peripheral device 230. Peripheral device 230 and host computing device 420 may need to be validated if a previous communication session has ended, timed out, or errored out. A validation process may determine the connectivity of the host computing device 420 and peripheral device 230 to each other and a network (e.g., network 140). Validation may include generating a challenge message 631 and encrypting it using first key 431 to generate validation data packet 630. Upon receiving validation data packet 630, peripheral device 230 may decrypt it using second key 432 stored in secure enclave 250. Peripheral device 230 upon decryption of challenge message 631 may respond to host computing device 420 by encrypting the challenge message 631 using second key 432 and send response data packet 670. Host computing device 420 may complete the validation process by decrypting response data packet 670 using first key 431 and comparing it with the sent challenge for a match.

In some embodiments, validation may include sharing second key 432 with peripheral device 230 generated during the registration of peripheral device 230 and receiving validation confirmation message 670. Host computing device 420 may need to decrypt validation confirmation message 670 using first key 431. In some embodiments, host computing device 420 may send a hash of second key 432 for validation purposes. Host computing device may send a validation request along with second key 432 and may encrypt it with first key 431.

Peripheral device 230 may consider a request for a communication session (described in connection with FIG. 7 and its description below) to validate connectivity of host computing device 420. In some embodiments, peripheral device 230 may consider the first response in a communication session as a validation.

FIG. 7 shows an exemplary data communication session 710 between peripheral device 230 and host computing device 420, according to embodiments of the present disclosure. Peripheral device 230 may need to generate a cryptographic session key 741 to participate in communication session 710. Peripheral device 230 may use session key 741 to encrypt data 742 shared with host computing device 420 during communication session 710. Session key 741 may be stored in memory 240 along with data 742 shared with hot computing device 420 during the communication session 710. In some embodiments, secure enclave 250 may store session key 741 and second key 432 used for registration, validation, and secure communication channel setup described in connection with FIGS. 4, 5, and 6 and their descriptions above.

In some embodiments, session key 741 may be generated by host computing device 420 or CIMR 110 (as shown in FIG. 1). Upon generation of session key 741 by CIMR 110, system 100 may transfer session key 741 to host computing device 420. In some embodiments, system 100 may encrypt session key 741 using first key 431. Host computing device 420 may share the session key with peripheral device 430. Session key 741 may act as a symmetric key used for encryption and decryption of communication messages transmitted between peripheral device 230 and host computing device 420.

Upon receiving session key 741, peripheral device 230 may store it in session keys 242 (as shown in FIG. 1). In some embodiments, peripheral device 230 may need to decrypt session key 741 before storing it. Peripheral device 230 may then send session key 741 encrypted with second key 432 to host computing device 420. Peripheral device 230 may retrieve second key 432 from key store 252. In some embodiments, peripheral device 230 may request CIMR for second key 432. Upon receiving session key 741 from peripheral device 230, host computing device 420 may save session key 741 in system memory 321 (as shown in FIG. 3). Host computing device 420 and peripheral device 230 may conduct the rest of the communication session by encrypting messages using session key 741.

A scenario where host computing device 420 may be tasked with generating and managing session key 741 may operate as follows. Host computing device 420 upon generation of session key 741 may transfer it to peripheral device 230. Host computing device 420 may encrypt session key 741 using first key 431. Upon receiving session key 741, peripheral device 230 may store it in session keys 242. In some embodiments, peripheral device 230 may need to decrypt session key 741 using public key 432 before storing the session key 741. Peripheral device 230 may send a confirmation of receipt of session key 741 by encrypting session key 741 using public key 432 and sending it to host computing device 420. Host computing device 420 may compare the received session key with the session key 741 generated by host computing device 420. In some embodiments, host computing device 420 may save session key 741 in system memory 321 after confirming the received session key for a match. Host computing device 420 and peripheral device 230 may conduct the rest of the communication session by encrypting messages using session key 741.

A scenario where peripheral device 230 is tasked with generating a session key for establishing secure communication may operate in the following manner. Peripheral device 230 may initiate communication session 710 by generating and share session key 741 with host computing device 420. Peripheral device 230 may share session key 741 as part of session data packet 750 encrypted using second key 432 stored in secure enclave 250. A session data packet (e.g., session data packet 750) is a communication message sent from a peripheral device (e.g., peripheral device 230) to a host computing device (e.g., host computing device 420). The session data packet may include data captured by the peripheral device and encrypted using a cryptographic key (e.g., second key 432, session key 741). Session data packet 750 may include an indication of the first session data packet. In some embodiments, peripheral device 230 may broadcast a session data packet to all available host computing devices (e.g., host computing devices 120). In some embodiments, peripheral device 230 may multicast session data packet 750 to multiple host computing devices that registered with peripheral device 230, such as host computing device 420 and server 550 described in connection with FIG. 5 and its description above. In some embodiments, peripheral device 230 may need to encrypt session data packet 750 containing session key 741 with different cryptographic key (e.g., second key 432) for each of the host computing devices (e.g., host computing devices 120).

Host computing device 420 upon receiving session data packet 750, may retrieve session key 741 by decrypting session data packet 750 using first key 431, which pairs with second key 432. Host computing device 420 may store session key 741 in memory 770. Memory 770 may be a system memory 321 (as shown in FIG. 3) or storage 328 implementing a database, such as crypto keys database 150 (as shown in FIG. 1). In some embodiments, host computing device 420 may send an acknowledgment after storing session key 741 in memory 770. Host computing device 420 may use session key 741 shared by peripheral device 230 to decrypt future messages from peripheral device 230. Session key 741 may be a symmetric key that can be used to encrypt and decrypt a message.

Peripheral device 230 may share additional data, such as data 742 during communication session 710 with host computing device 420 by encrypting additional information using session key 741. Data 742 may be captured by peripheral device 230, similar to data 440 capture described in connection with FIG. 4 and its description above. Encryption of data 742 using session key 741 may generate a session data packet 760 containing captured data 742. In some embodiments, session data packet 760 may include additional information related to communication session 710. Additional information may include session data packet number, checksum of data 742, last session data packet flag. In some embodiments, peripheral device 230 may send a special session data packet to indicate the end of communication session 710. Host computing device 420 upon receiving session data packets (e.g., session data packet 750, 760) of a communication session 710 may send an acknowledgment message. The acknowledgment message may include additional information such as an error code or request for more data or command to end communication session 710. Peripheral device 230 upon receiving an acknowledgment message with an error code, may resend a session data packet. Peripheral device 230 may delete session key 741 and captured data 742 upon completion of communication session 710.

FIG. 8A is a flow diagram of an exemplary peripheral device 230 registration process using centralized identity management resource (CIMR) 110, according to some embodiments of the present disclosure. As illustrated in FIG. 8A, host computing devices 120 may include computing devices: mobile device 821, laptop device 822, desktop device 823. Host computing devices 120 may communicate with peripheral device 230 after registering peripheral device 230 using CIMR 110.

In step 1, CIMR 110 may provide data packet 850 that includes cryptographic key pair 851-852 to identify peripheral device 230 and register peripheral device 230 for initiating future communication sessions. Cryptographic key pair 851-852 may include private and public cryptography keys 851 and 852, respectively. Cryptographic key pair 851-852 is similar to cryptographic key pair 431-432 described in connection with FIG. 4 and its description above. CIMR 110 may broadcast cryptographic key pair 851-852 to all available host computing devices 821-823. CIMR 110 may share cryptographic key pair 851-852 to register peripheral device 230 upon receiving a presence request from peripheral device 230. In some embodiments, CIMR 110 may multicast cryptographic key pair 851-852 to host computing devices (e.g., laptop device 822, desktop device 823) capable of communicating with peripheral device 230. Host computing device 420 may be capable of communicating with peripheral device 230 if it has an appropriate connector (e.g., peripheral devices controller) to connect peripheral device 230 or includes software application to parse the data received from the peripheral device 230. For example, CIMR may share cryptographic key pair associated with a Bluetooth peripheral device capable of pairing using Bluetooth v4.2 to only host computing devices with the latest Bluetooth chipset to pair with a Bluetooth peripheral device. In some embodiments, host computing devices 120 may only receive data packet 850 with private key 851.

In some embodiments, CIMR 110 may share cryptographic key pair 851-852 with host computing device (e.g., desktop device 823) to which user 460 has submitted a request to register peripheral device 230. In some embodiments, peripheral device 230 may communicate with CIMR 110 to share cryptographic key pair 851-852 with host computing devices 821-823. For example, peripheral device 230 may communicate with CIMR 110 to help with registration when powered, turned on, connected to a network (e.g., network 140), or activated by user interaction. CIMR 110 may identify and share with peripheral device 230 a list of host computing devices (e.g., host computing devices 821-823) available and/or capable of communicating with peripheral device 230. Peripheral device 230 may register host computing devices 821-823 as trusted devices. Peripheral device 230 may use trusted partner module 253 (as shown in FIG. 2) to register a host computing device as a trusted device.

Host computing devices 821-823 upon receiving cryptographic key pair 851-852, may store privately key 851 in memory 770 (as shown in FIG. 7) and send public key 852 to peripheral device 230. In some embodiments, the host computing devices 821-823 may store the private key 851 in external storage, such as crypto keys database 150 (as shown in FIG. 1). CIMR 110 may generate cryptographic key pair 851-852 and share them with host computing devices 821-823. Identity management module 111 of CIMR 110 may aid in generating cryptographic key pair 851-852. CIMR 110 may generate a different cryptographic key pair for each host computing devices 821-823 that may register peripheral device 230. CIMR 110 may request identity management database 112 (as shown in FIG. 1) to store the cryptographic key pair 851-852 for future requests to register peripheral device 230. In some embodiments, CIMR 110 may retrieve public key 852 from identity management database 112 and send it to host computing devices 821-823 to help register peripheral device 230. Host computing device may access the matching private key 851 from local storage (e.g., crypto keys database 150). In some embodiments, CIMR 110 may send separately cryptographic key pair 851-852 to host computing devices 821-823 and peripheral device 230 to begin registration of peripheral device 230.

In step 2, host computing device (e.g., desktop device 823) may begin registration of peripheral device 230 by sharing public key 852 with peripheral device 230. Peripheral device 230 may use public key 852 to communicate with desktop device 823 in the future securely. Desktop device 823 may provide public key 852 as part of data packet 860 along with hash 861 of public key 852. In some embodiments, desktop device 823 may only send hash 861 to peripheral device 230.

Upon receipt of data packet 860, peripheral device 230 may store public key 852 in a secure location, such as secure enclave 250 and hash in hash map 241 (as shown in FIG. 2). In some embodiments, peripheral device 230 may locally generate a hash of public key 852 that uniquely identifies the public key 852 associated with a host computing device (e.g., desktop device 823). Peripheral device 230 may use the desktop device 823's unique identifier, such as network IP address, MAC address, or serial number as the hash key. Peripheral device 230 may store the generated hash in a hash map (e.g., hash map 241) that maps the hash of the public key 852 to the storage location of the public key 852 stored in key store 252. The storage location of public key 852 may be a network address, a memory location, a file path, or a combination.

In step 3, peripheral device 230 may generate and share success message 871 with desktop device 823 to complete peripheral device 230's registration. Peripheral device 230 may encrypt success message 871 with public key 852 to generate data packet 870 and share with desktop device 823. In some embodiments, success message 871 may include data captured and collected by peripheral device 230.

Desktop device 823 upon receiving data packet 870 with success message 871, may decrypt using private key 851. Upon successful decryption, desktop device 823 may parse the success code in success message 871 to register peripheral device 230. The success message 871 may include additional details such as the amount of time the registration is valid, the amount and type of data available for communication, and other configurable parameters. Desktop device 823 may utilize the shared configurable parameters when communicating with peripheral device 230. If desktop device 823 fails to decrypt message 871, desktop device 823 may assume interception of data packet 870 sent by peripheral device 230. In some embodiments, the data packet 870 may include an error code indicating peripheral device 230 failure to register desktop device 823. Desktop device 823 upon receiving an error code in data packet 870, may terminate further communication with peripheral device 230. Registration of peripheral device 230 by desktop device 823 may result in the setup of a secure communication channel for future communication. Upon successful registration, desktop device 823 may initiate a communication session with peripheral device 230 using the secure communication channel. In some embodiments, peripheral device 230 may securely communicate with desktop device 823 after step 3 by encrypting captured and collected data using public key 852 and sending it to desktop device 823. In some embodiments, peripheral device 230 may generate a session key and utilize it for secure communication with desktop device 823 after step 3. The generated session key may only be valid for a limited time, for example, the current communication session. In some embodiments, the session key may be limited by the number of messages peripheral device 230 may securely communicate with desktop device 823. Peripheral device 230 may generate a session key as part of success message data packet 870. In some embodiments, peripheral device 230 may include the session key as the success message 871 in data packet 870.

Figure 8B:
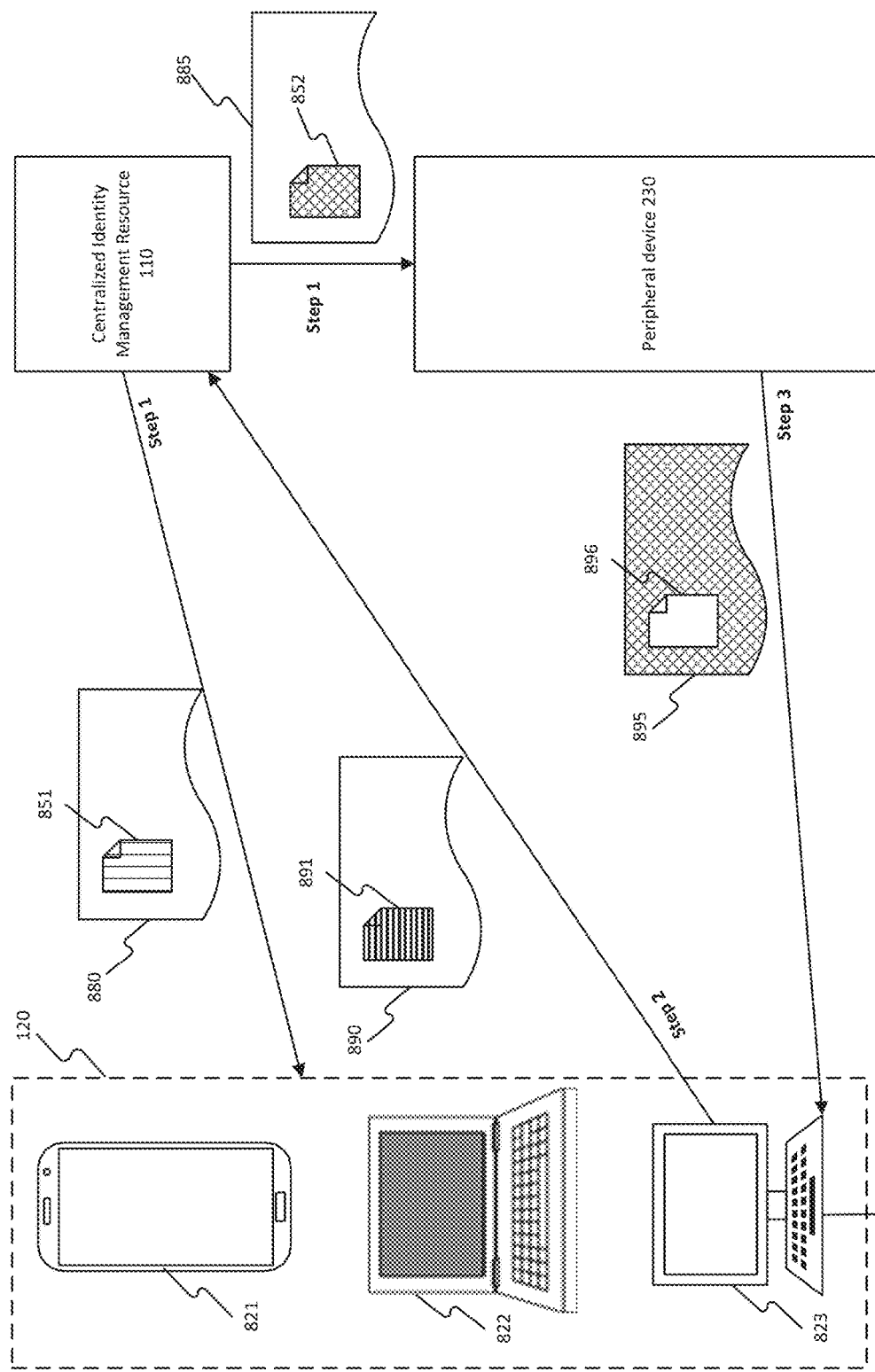
FIG. 8B is a flow diagram of an exemplary peripheral device registration using a centralized identity management resource, according to some embodiments of the present disclosure.

FIG. 8B is a flow diagram of an exemplary peripheral device 230 registration process using centralized identity management resource (CIMR) 110, according to some embodiments of the present disclosure. The flow diagram in FIG. 8B is an alternative to FIG. 8A, where CIMR 110 manages secure communication setup.

In step 1, CIMR 110 shares with host computing devices (e.g., host computing devices 821-823) a data packet 880, including access to private key 851 copy. CIMR 110 may simultaneously share data packet 885 with peripheral device 230, including access to private key 851 copy. Upon receiving data packet 855, peripheral device 230 may retrieve private key 852 and store it in secure enclave 250. In some embodiments, peripheral device 230 and host computing devices 821-823 may now securely communicate by encrypting and decrypting data using cryptographic key pair 851-852. A host computing device (e.g., desktop device 823) upon receiving private key 851 may determine the peripheral device (e.g., peripheral device 230) associated with private key 851. In some embodiments, data packet 880 may include the identity of peripheral device 230, such as a network IP address, MAC address, device serial number, or hash of public key 852.

In some embodiments, CIMR 110 may allow desktop device 823 to access private key 851 by adding it to the list of host computing devices having access to private key 851. In some embodiments, CIMR 110 may share a copy of private key 851 with host computing devices 821-823. CIMR 110 may only provide a pointer to the private key. The pointer may point to a location in crypto keys database 150 or identity database 112. The access to private key 851 using a pointer may result in retrieving the private key 851 from a secure enclave environment. CIMR 110 may provide access to desktop device 823 based on a security policy residing at CIMR 110. The security policy may be a user-configurable file uploaded by the user of system 100.

In some embodiments, cryptographic key pairs may be managed in a distributed manner allowing CIMR 110 to request other host computing devices to share the private key 851 with desktop device 823. CIMR 110 may request other host computing devices who have previously communicated with peripheral device 230 and thus have access to private key 851.

CIMR 110 may manage the cryptographic key pairs and regularly refresh the keys. CIMR 110 may synchronize keys of a host computing device (e.g., desktop device 823) by copying all possible keys associated with various peripheral devices (e.g., peripheral devices 130) available in system 100. In some embodiments, CIMR 110 may also synchronize the keys present in a host computing device (e.g., desktop device 823) and replace the old versions of the keys.

In step 2, a host computing device (e.g., desktop device 823) intending to communicate with peripheral device 230 may convey the intention to CIMR 110. Desktop device 823 may convey the intention by sharing data packet 890, including identity 891 of peripheral device 230 with whom it intends to communicate with. Identity 891 may include a hash of private key 851 or public key 852 or some other identification of peripheral device 230 shared in step 1.

CIMR 110 may forward the communication intent from desktop device 823 to peripheral device 230. In some embodiments, peripheral device 230 may regularly ping CIMR 110 to confirm if any of the host computing devices requested to communicate. In some embodiments, CIMR 110 may forward the communication intent to another host computing device that is physically connected with peripheral device 230. In some embodiments, CIMR 110 may act as a host computing device and direct peripheral device 230 to share data with desktop device 823.

In some embodiments, CIMR 110 may validate desktop device 823 before forwarding the communication intent to peripheral device 230. CIMR 110 may validate desktop device 823 by checking its network connectivity. In some embodiments, CIMR 110 may validate desktop device 823 by evaluating its capabilities, such as computational power, storage capacity, hardware, software tools availability, and speed of network connection. Desktop device 823 may be validated based on a security policy installed in CIMR 110. Security policy may include a set of requirements to be satisfied by desktop device 823, such as a version of an operating system running on desktop device 823 or a version of an application in need of data provided by peripheral device 230. In some embodiment, desktop device 823 may need to provide authentication information to CIMR 110. The authentication information may determine if desktop device 823 is a valid device authorized to have a secure communication channel with peripheral device 230. The authentication information may validate if the user of desktop device 823 and another host computing device connected to peripheral device 230 is the same user. For example, a host computing device user may be validated by requesting the same user to provide credentials on a mobile device (second host computing device) using a fingerprint scan sensor peripheral device.

In step 3, peripheral device 230 may share data packet 895 with data 896 captured by peripheral device 230. Data packet 895 is an encrypted copy of data 896 captured by peripheral device 230. Peripheral device 230 may capture data upon receiving a communication forwarded by CIMR 110 or share previously collected data stored in memory (e.g., memory 240). In some embodiments, peripheral device 230 may forward the collected data to CIMR 110.

Figure 9:
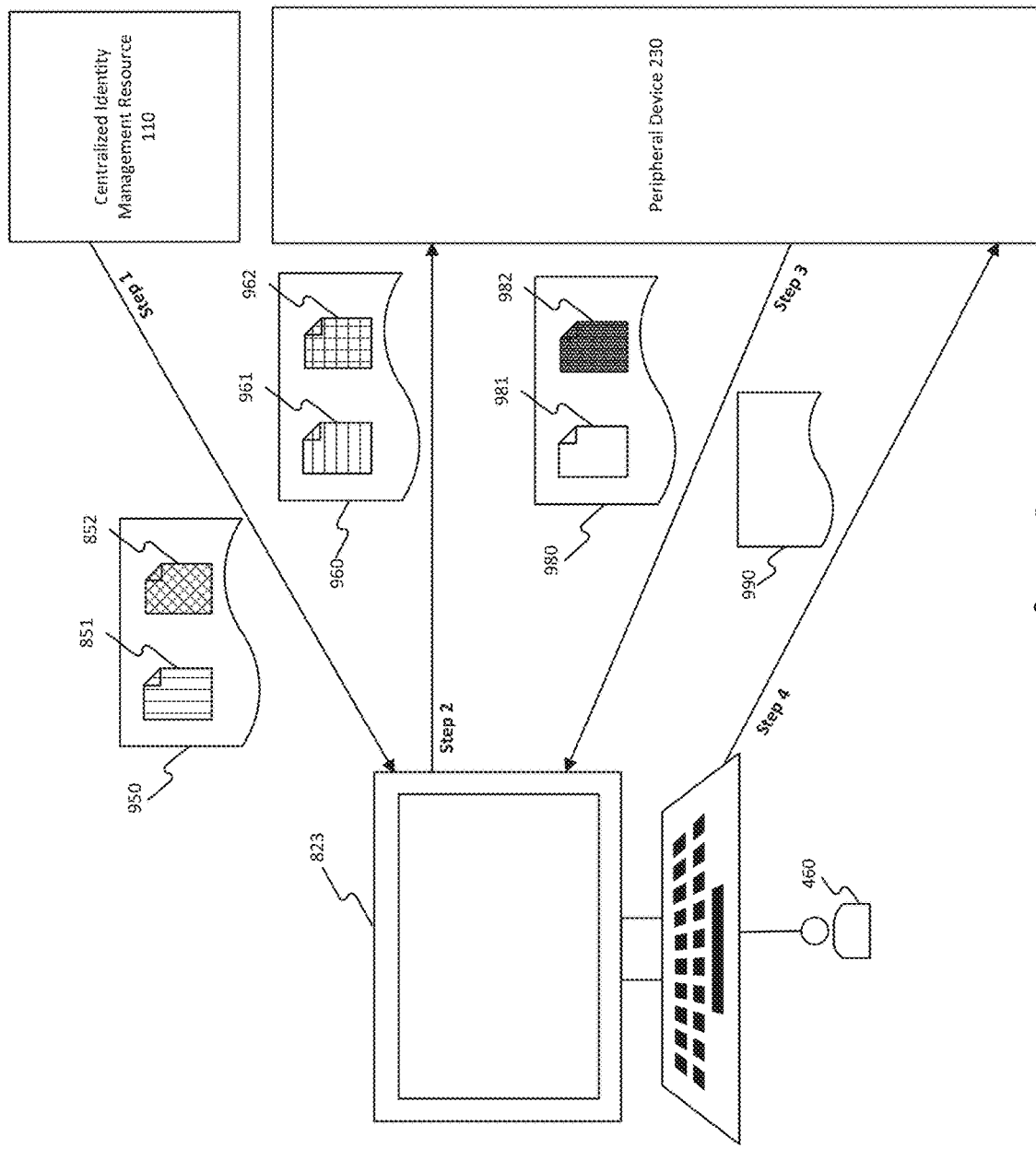
FIG. 9 is a flow diagram of an exemplary communication session between a desktop device and a peripheral device managed by a centralized identity management resource, according to some embodiments of the present disclosure.

FIG. 9 is a flow diagram of an exemplary communication session between desktop device 823 and peripheral device 230 managed by centralized identity management resource (CIMR) 110, according to some embodiments of the present disclosure.

In step 1, desktop device 823 may receive from CIMR 110 cryptographic key pair 851-852 needed to set up a communication session. CIMR 110 may send the cryptographic key pair 851-852 as data packet 950. In some embodiments, desktop device 823 may only receive public key 852 as part of data packet 950 and access private key 851 from crypto keys database 150 (as shown in FIG. 1). Desktop device 823 may use public key 852 to lookup associated private key 851 in crypto keys database 150. In some embodiments, data packet 950 may include a hash of private key 851 and public key 852 used to retrieve cryptographic key pair 851-852 from crypto keys database 150. CIMR 110 may send data packet 950 to desktop device 823 upon receiving updated connection status from the peripheral device (e.g., peripheral device 230). The connection status update may include peripheral device connection to desktop device 823 or peripheral device 230 or connected to the Internet (e.g., network 140). In some embodiments, CIMR 110 may send cryptographic key pair 851-852 upon receiving a request from desktop device 823 to initiate a communication session with peripheral device 230.

In step 2, desktop device 823 may generate hash 962 of public key 852 provided by CIMR 110. Desktop device 823 may share data packet 960, including challenge 961 and hash 962, with peripheral device 230 indicating a request to initiate a communication session. Desktop device 823 may generate a challenge by encrypting a challenge message with private key 851. The challenge message may be a generic text or may include identification information of the host computing device (e.g., desktop device 823), peripheral device 230, or both. The identification information may be desktop device 823's network IP address or MAC address of the network interface (e.g., network interface 318 of FIG. 3), serial number, or a combination of different IDs. The challenge may also be a randomly generated number, text, or alphanumeric string of characters. Desktop device 823 may store challenge message in storage 328 (as shown in FIG. 3) before sending data packet 960 with challenge 961 to peripheral device 230.

Peripheral device 230 upon receiving the data packet 960, may attempt the parse challenge message by decrypting the challenge 961. Peripheral device 230 may identify the encryption key needed to decrypt message 961 using hash 962 of public key 852. Peripheral device 230 may look-up hash 962 in hash map 241 (as shown in FIG. 2) to identify the decryption key (e.g., public key 852) needed to decrypt challenge 961. Peripheral device 230 may retrieve public key 852 from key store 252 (as shown in FIG. 2) to help decrypt message 961. Peripheral device 230 may be an integrated internal component of the host computing device (e.g., desktop device 823) and may automatically identify the encryption key needed to decrypt challenge 961.

The challenge may include successful decryption and retrieval of a challenge message in challenge 961. In some embodiments, the challenge may also include executing multiple computation steps listed in the challenge message. The peripheral device 230 may send an error message upon failure to decrypt challenge 961, or the decrypted challenge message is garbled. Challenge 961 may also include a checksum to validate the decrypted message. Peripheral device 230 may need to validate the decrypted challenge using the checksum before parsing the challenge message. Peripheral device 230 upon successful decryption and validation of challenge 961 may respond to the host computing device (e.g., desktop device 823), as described in step 3 below.

In step 3, peripheral device 230 may initiate a communication session by sending a data packet 980, including decrypted message 981 and symmetric key 982, to desktop device 823. In some embodiments, data packet 980 may be encrypted using public key 852 of cryptographic key pair 851-852. Peripheral device 230 may generate symmetric key 982 or request CIMR 110 to aid in symmetric key 982. Symmetric key 982 of data packet 980 may be used for a secure communication session between peripheral device 230 desktop device. Symmetric key 982 may be used for both encryption and decryption of data shared by peripheral device 230 to desktop device 823. Peripheral device 230 may generate a new symmetric key for a new communication session request sent by desktop device 823. In some embodiments, peripheral device 230 may encrypt the decrypted challenge message using symmetric key 982 and include it in data packet 980 sent to desktop device 823.

Desktop device 823 upon receiving the data packet 980, may store the symmetric key 982 in memory 770. Desktop device 823 may confirm the success of encrypted challenge 961 before storing symmetric key 982. Desktop device 823 confirms the success of encrypted challenge 961 by comparing the received decrypted message 981 with the stored challenge message. In some embodiments, desktop device 823 may need to decrypt message 981 using symmetric key 982 before confirming the success of encrypted challenge 961. If desktop device 823 fails to decrypt message 981, it may send a new session initiation request to peripheral device 230. In some embodiments, desk-top device 823 may terminate the communication session upon failure to access message 981 or if message 981 includes an error code.

In step 4, a host computing device (e.g., desktop device 823) may confirm the initiated communication session and send a request for data to peripheral device 230. Desktop device 823 may confirm an initiated communication session by sending data request packet 990 to peripheral device 230. Peripheral device 230 upon receiving data request packet 990, may begin capturing data (as described in FIG. 4 above) and sending captured data encrypted using the session key (e.g., symmetric key 982), as described in FIG. 8 above. In some embodiments, desktop device 823 may send an acknowledgment message upon successful receipt of each data packet (e.g., data packet 980) from peripheral device 230. Successful receipt of a data packet may include successful decryption of the data packet contents using symmetric key 982. Desktop device 823 may also send commands as part of the acknowledgment message. For example, desktop device 823 may send an acknowledgment message that includes a stop command to stop the communication session.

The communication session between desktop device 823 and peripheral device 230 may persist until desktop device 823 sends a stop request. In some embodiments, a communication session between a host computing device (e.g., desktop device 823) and peripheral device (e.g., peripheral device 230) may timeout for lack of data requests from desktop device 823 or delays in sending data from peripheral device 230. In some embodiments, Desktop device 823 communication session initiation request may include the communication session termination condition. The termination condition may be part of challenge 961 and could include a trigger event to terminate the communication session. The trigger event may include the number of data requests, amount of data, and time for communication. In some embodiments, the lack of an acknowledgment message may result in timeout and termination of the communication session. Desktop device 823 and peripheral device 230 may terminate the communication session based on certain criteria, such as a number of failed data requests. The criteria for terminating a communication session may be configurable by user 460. The configurable criteria may be supplied with challenge 961 or separately in data packet 960. In some embodiments, desktop device 823 and peripheral device 230 may access termination condition criteria or trigger event from CIMR 110. Desktop device 823 may revise the termination condition during a communication session. Desktop device 823 upon receiving the required data or meeting the requirements, may send a communication termination command to peripheral device 230.

Figure 10:
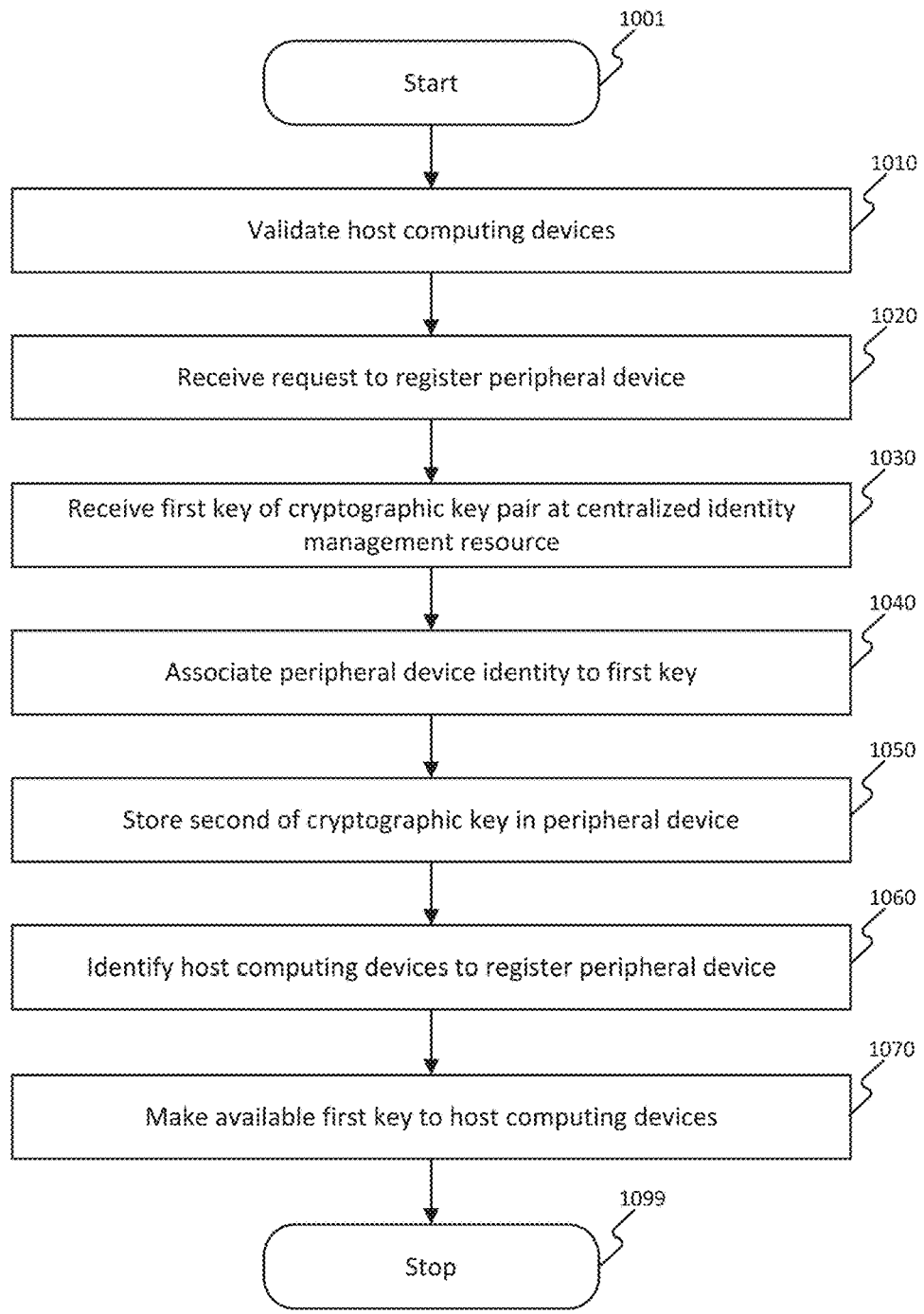
FIG. 10 is a flowchart depicting operations of an exemplary method for secure communication channel setup between a host computing device and a peripheral device, according to some embodiments of the present disclosure.

FIG. 10 is a flowchart depicting operations of an exemplary method 1000 for secure communication channel setup between host computing device 420 and peripheral devices 130, according to some embodiments of the present disclosure. The steps of method 1000 may be performed by system 100 for purposes of illustration. It will be appreciated that the illustrated method 1000 may be altered to modify the order of steps and to include additional steps.

In step 1010, system 100 may begin secure communication channel setup by first validating host computing device 420. System 100 may validate host computing device 420 by checking its network connectivity. In some embodiments, system 100 may validate host computing device 420 by evaluating host computing device 420's capabilities, such as computational power, storage capacity, hardware, software tools availability, and network connection speed, among others. System 100 may validate host computing device 420 based on a security policy in some embodiments. The security policy may include a set of requirements to be satisfied by host computing device 420, such as requiring a specific version of the operating system running on host computing device 420 or a particular version of an application requesting data from peripheral device 230. In some embodiments, host computing device 420 may need to provide authentication information to system 100. The authentication information determines if the host computing device 420 is a valid device authorized to have a secure communication channel with a peripheral device (e.g., peripheral device 230). The authentication information may validate if the user of host computing device 420 and another host computing device connected to peripheral device 230 are the same. For example, system 100 may validate a host computing device's user by requesting the same user to provide credentials on a mobile device (second host computing device) using a fingerprint scan sensor peripheral device.

In step 1020, system 100 may receive a request to register a peripheral device (e.g., peripheral device 230). Host computing device 420 upon validation may begin sharing the peripheral device registration request. In some embodiments, host computing device 420 may begin accepting registration requests from peripheral devices upon successful validation of itself by system 100. The request to register peripheral device 230 may arrive over network 140. The registration request may be initiated by host computing device 420 based on applications running on the device. In some embodiments, a user (e.g., user 460) may send the request to register peripheral device 230 to host computing device 420 to help communicate with peripheral device 230. In some embodiments, host computing device 420 may receive a request to communicate with peripheral device 230, including a registration request by another host computing device. For example, an application running on a computer (first host computing device) may require two-factor authentication resulting in a mobile device (second host computing device) to request fingerprint or face recognition identification. The identification is provided by the mobile device using a peripheral device (touch sensor or camera) connected to the mobile device that registers the peripheral device(s) and requests data from them. A detailed description of a method for peripheral device registration is provided in connection with FIG. 11 below.

In step 1030, system 100 may receive a first key (e.g., first key 431) of a cryptographic key pair (e.g., cryptographic key pair 431-432) from a centralized service (e.g., Centralized Identity Management Resource 110). The system 100 upon detecting a request to register peripheral device 230, may trigger CIMR 110 to generate and send cryptographic key pair 431-432 to the host computing device 420 over network 140. In some embodiments, host computing device 420 or peripheral device 230 may generate the cryptographic key pair and distribute it to the other devices. Host computing device 420 may generate a cryptographic key pair and get ready to register and securely communicate with peripheral device 230 and others. In some embodiments, peripheral device 230 may generate a cryptographic key pair as part of the registration process. In some embodiments, system 100 may receive the first key from crypto keys database 150. The crypto keys database 150 may include cryptographic key pairs previously provided by CIMR 110. In some embodiments, system 100 may replace an existing cryptographic key upon receiving first key 431. First key 431 may be a private key (e.g., private key 851) of cryptographic key pair 851-852. In some embodiments, peripheral device 230 may request CIMR 110 to send first key 431 to host computing device 420 of system 100.

In step 1040, system 100 may associate the identity of peripheral device 230 with first key 431. System 100 may receive the identity of peripheral device 230 received as part of the registration request in step 1010. Identity of peripheral device 230 may include peripheral device 230's network IP address, MAC address, or the serial number of peripheral device 230. In some embodiments, CIMR 110 may provide the identity of peripheral device 230 to system 100. System 100 may store the associations between peripheral device 230 and first key 431 internal in memory 770 (as shown in FIG. 7) or externally in crypto keys database 150.

In step 1050, system 100 may store second key 432 of cryptographic key pair in peripheral device 230. System 100 may request CIMR 110 to provide second key 432 to send to peripheral device 230. System 100 may send second key 432 to peripheral device 230 over network 140. Second key 432 may be a public key (e.g., public key 852) of a cryptographic key pair 851-852.

In step 1060, system 100 may identify a set of host computing devices (including host computing device 420) to register with peripheral device 230. Registration of peripheral device 230 may include a request to load appropriate tools to understand the data transmitted by peripheral decide 230. For example, when attached to a host computing device, a camera peripheral device may result in an appropriate driver loaded in the host computing device 420 to communicate with the camera peripheral device. In some embodiments, system 100 may only select host computing devices validated similar to host computing device 420 in step 1010 above.

System 100 may identify host computing device 420 from a list of host computing devices that previously communicated with peripheral device 230. In some embodiments, system 100 may identify host computing device 420 based on the additional data received along with the peripheral device 230 registration request. For example, a software application may request system 100 to help verify a user (e.g., user 460) using facial recognition method, causing system 100 to reach out to host computing device (e.g., host computing device 420) owned and/or controllable by the same user. The host computing device may then use an attached camera peripheral device to capture an image to verify the user 460 using face recognition technology.

In step 1070, system 100 may make available first key 431 to the identified and validated host computing devices (including host computing device 420) for secure communication with peripheral device 230. System 100 may make first key 431 available to host computing device 420 by adding to the list of host computing devices having access to first key 431. In some embodiments, system 100 may share a copy of first key 431 with host computing device 420. System 100 may only provide a pointer to first key 431. The pointer may point to a location in crypto keys database 150 or identity database 112. System 100 may make first key 431 available to the identified host computing devices based on a security policy. In some embodiments, system 100 may skip providing access to first key 431 to some of the identified host computing devices in step 1050 based on the security policy. The security policy used for making available first key 431 may be different from a security policy to validate identified host computing devices in step 1060 above. The security policy may be a user-configurable file provided as part of peripheral device 230 registration request.

Distribution of the first and second key to host computing device 420 and peripheral device 230 allows for secure communication between them using the first and second cryptographic keys 431-432 to encrypt and decrypt the communicated data. In some embodiments, host computing device 420 may receive both first and second cryptographic keys 431-432 and then sends the second key 432 to peripheral device 230. System 100, upon completion of step 1070, completes (step 1099) executing method 1000.

In some embodiments, system 100 may provide a session key to host computing device 420 for secure communication with peripheral device 230. The generated session key may only be valid for a limited time, for example, the current communication session. In some embodiments, the session key may be limited by the number of messages shared between peripheral device 230 and host computing device 420. Session key may be generated by CIMR 110 (as shown in FIG. 1) or host computing device 420, or peripheral device 230. Based on the device generating the session key, it may be managed differently and shared with other devices in system 100. A detailed description of the management of session key for secure communication by different components of system 100 is provided in connection with FIG. 6 and its corresponding description above.

Figure 11:
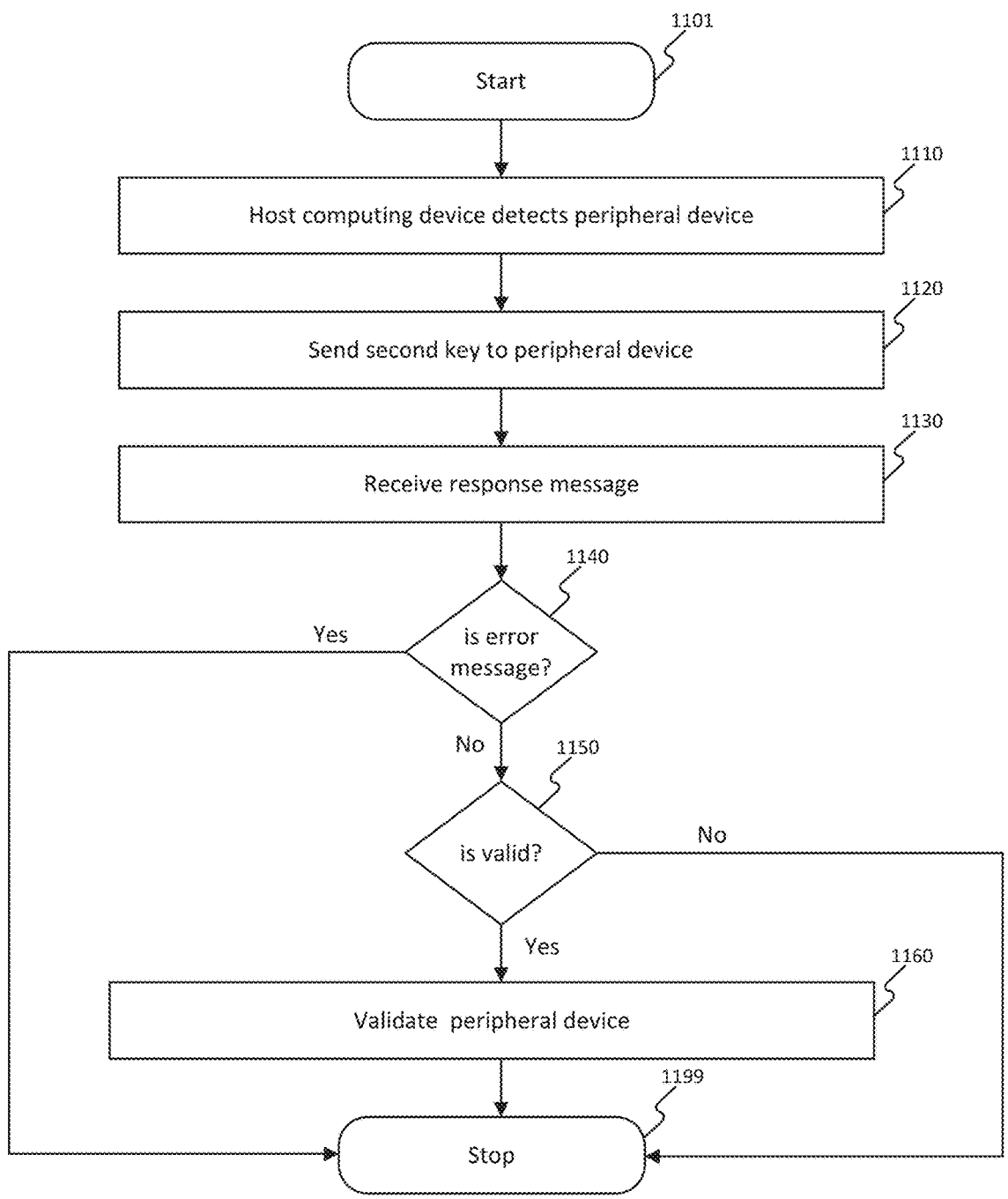
FIG. 11 is a flowchart depicting operations of an exemplary method for a host computing device to register a peripheral device, according to some embodiments of the present disclosure.

FIG. 11 is a flowchart depicting operations of an exemplary method 1100 for host computing device 420 to register peripheral device 230, according to some embodiments of the present disclosure. The steps of method 1100 may be performed by components of system 100 for purposes of illustration. It will be appreciated that the illustrated method 1100 may be altered to modify the order of steps and to include additional steps.

In step 1110, host computing device 420 may detect peripheral device 230 from a presence request shared by peripheral device 230. Peripheral device 230 may send a presence request upon being physically connected to host computing device 420. For example, a USB connector-based camera peripheral device may send a camera peripheral device's presence request when connected via a USB port to a host computing device. In some embodiments, a user (e.g., user 460) action to operate a peripheral device may result in the peripheral device generating a presence request. For example, user 460 may turn on a Bluetooth keyboard peripheral device pairing mode resulting in the peripheral device sending a presence request to host computing devices available present nearby.

In step 1120, host computing device 420 may send a second key (e.g., second key 432) to peripheral device 230. The second key may be a public key (e.g., public key 852) of a cryptographic key pair. Host computing device 420 may have received both second key 432 and first key 431 from CIMR 110 (as shown in FIG. 1). In some embodiments, host computing device 420 may request CIMR 110 to send the second key 432 to peripheral device 230. In some embodiments, host computing device 420 may generate a hash of second key 432 and send it along with second key 432. In some embodiments, host computing device 420 may only send a hash of second key 432 to peripheral device 230. Peripheral device 230 upon may look up second key 432's location in key store 252 using hash map 241.

In step 1130, host computing device 420 may receive a response message from peripheral device 230. Host computing device 420 may receive the response over network 140 at a network interface (e.g., network interface 318). The response message may indicate the successful receipt of second key 432 by peripheral device 230 sent by host computing device 420 in step 1120. In some embodiments, the response message may be encrypted using second key 432 and needs to be decrypted by host computing device 420 using first key 431 of cryptographic key pair 431-432.

In step 1140, host computing device 420 may terminate the registration process if the response message includes an error code. In some embodiments, host computing device 420 may take different actions based on different error codes. If the error code indicates that the second key 432 was corrupted, then host computing device 420 may jump back to step 1120 to resend second key 432 to peripheral device 230.

If the answer to the question in step 1140 was no, then host computing device 420 may proceed to step 1150. In step 1150, host computing device 420 may check the response's validity by decrypting the response message using first key 431. Host computing device 420 may consider the response message valid if it can successfully decrypt the response message.

If the answer to the question in step 1150 is no, then proceed to step 1160. In step 1160, host computing device 420 may validate peripheral device 230. Validation of peripheral device 230's identity may include registering peripheral device 230 as a trusted device. Registration of peripheral device 230 may include associating first key 431 with an identifier of peripheral device 230. In some embodiments, the registration process may include checking the registration field in a table with previously prepared associations. Peripheral device 230 may send an acknowledgment upon receiving registration message with second key 432 allowing system 100 to use host computing device 420 to communicate securely with peripheral device 230. Host computing device 420 upon receiving acknowledgment message may confirm peripheral device 230's registration and label it as a trusted device. In some embodiments, host computing device 420 may conduct the validation using an encrypted challenge. A detailed description of encrypted challenge based validation is provided in FIG. 14 description below. Host computing device 420 may communicate with system 100 about the completed registration process.

If the answer to the question in step 1140 is yes, then method 1100 execution jumps to step 1199. If the answer to the question in step 1150 is no, then method 1100 execution jumps to step 1199. In step 1199, host computing device 420 completes the execution of method 1100. Host computing device 420, upon completion of step 1160, also completes (step 1199) executing method 1100.

Figure 12:
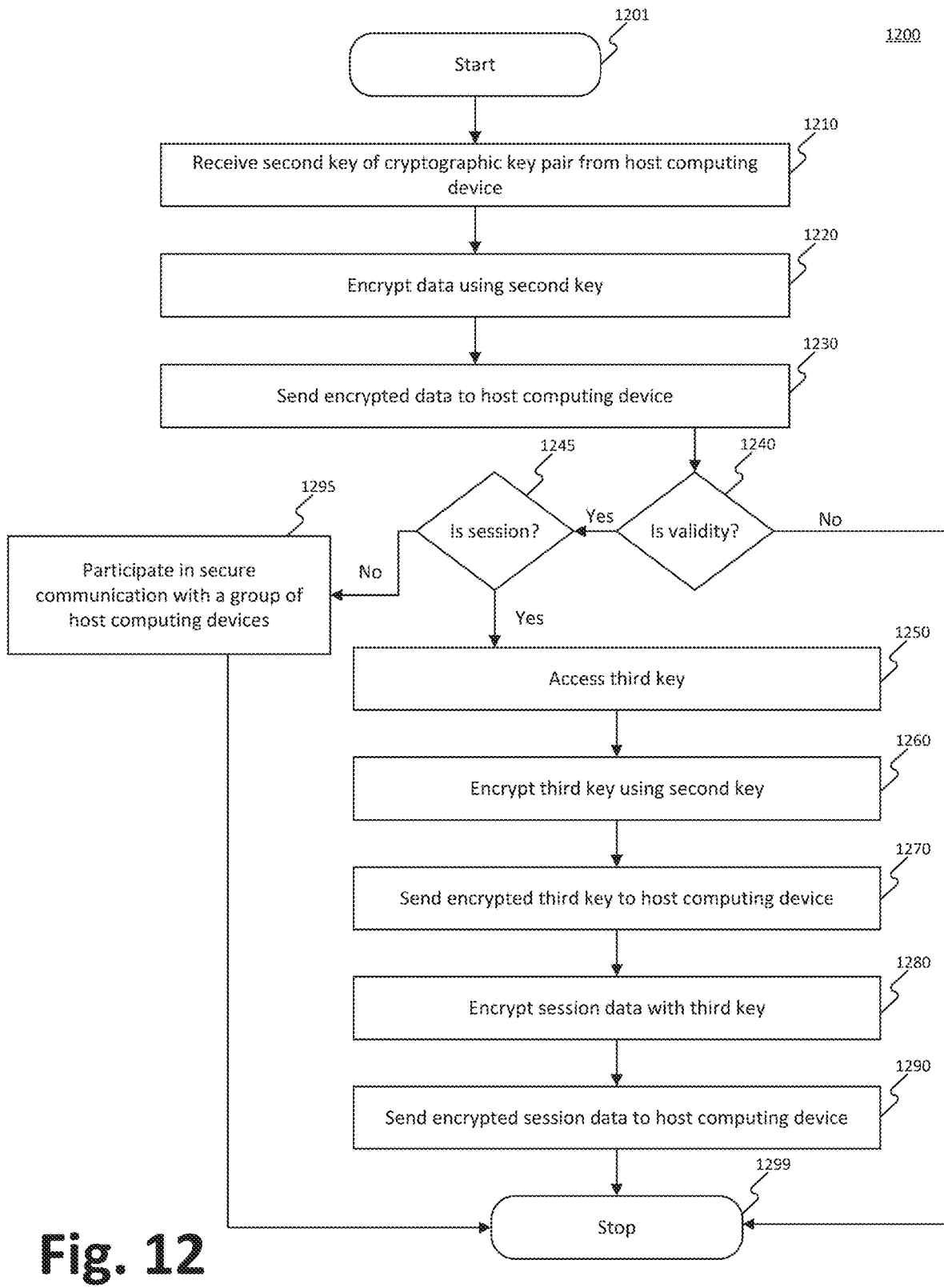
FIG. 12 is a flowchart depicting operations of an exemplary method for sharing data securely by a peripheral device, according to some embodiments of the present disclosure.

FIG. 12 is a flowchart depicting operations of an exemplary method 1200 for sharing data securely by peripheral device 230, according to some embodiments of the present disclosure. The steps of method 1200 may be performed by peripheral device 230 for purposes of illustration. It will be appreciated that the illustrated method 1200 may be altered to modify the order of steps and to include additional steps.

In step 1210, peripheral device 230 may receive a second key (e.g., second key 432) from host computing device (e.g., host computing device 420). Peripheral device 230 may receive second key 432. In some embodiments, host computing device 420 may delegate sharing the second key to another host computing device. In some embodiments, CIMR 110 may help host computing device 420 to send the second key to peripheral device 230.

In step 1220, peripheral device 230 may encrypt available data using second key 432. Peripheral device 230 may capture data (e.g., data 440) before encrypting data using second key 432. In some embodiments, peripheral device 230 may In step 1230, peripheral device 230 may send encrypted data to host computing device 420. Peripheral device 230 may send encrypted data directly to host computing device 420. In some embodiments, peripheral device 230 may request another intermediary host computing device or CIMR 110 to help send the encrypted data to host computing device 420.

In step 1240, peripheral device 230 may check if there is a feedback response indicating that host computing device 420 has validated peripheral device 230's validity. Peripheral device 230 may confirm its identity validation to share data with host computing device 420. If the answer to the question in step 1240 is no, i.e., host computing device 420 failed to validate peripheral device 230's identity, then execution of method 1200 may jump to step 1299. Host computing device 420 may validate the identity of peripheral device 230 by successfully identifying the first key (e.g., first key 431) to decrypt and decrypting the encrypted data sent in step 1220.

If the answer to the question in step 1240 is yes, i.e., host computing device 420 could validate peripheral device 230's identity, then method 1200 execution may proceed to step 1245. In step 1245, peripheral device 230 may check if there is a request for a session. If the answer to the question in step 1250 is no, i.e., there is no session requirement, then execution of method 1200 may jump to step 1295.

If the answer to the question in step 1245 is yes, i.e., there are session requirements, then execution of method 1200 may proceed to step 1250. In step 1250, peripheral device 230 may access a third cryptographic key (e.g., session key 741). Peripheral device 230 may access the third key by requesting secure enclave 250 to provide the third key. Secure enclave 250 may generate the third key or select a previously generated third key from key store 252. Peripheral device 230's request to access the third key may result in locking the third key for use by peripheral device 230 to communicate with host computing device 420.

In step 1260, peripheral device 230 may encrypt the third key using second key 432. Main processing unit 260 of peripheral device 230 may encrypt the third using second key 432. Main processing unit 260 may temporarily store the encrypted third key in memory 240 and reuse it for future communication sessions.

In step 1270, peripheral device 230 may send the encrypted third key to host computing device 420 directly or over network 140. Similar to data in step 1220, peripheral device 230 may share either directly or through an intermediary encrypted third key with host computing device 420. In some embodiments, peripheral device 230 may send an encrypted third key with a group of host computing devices for establishing communication sessions.

In step 1280, peripheral device 230 may encrypt session data with the third key. Peripheral device 230 may capture data (e.g., 440) from the environment before encrypting the data. A user (e.g., user 460) intending to communicate with host computing device 420 may supply the captured data by interacting with peripheral device 230.

In step 1290, peripheral device 230 may send encrypted session data to host computing device 420. Peripheral device 230 may directly send encrypted session data to host computing device 420. In some embodiments, peripheral device 230 may rely on other host computing devices and CIMR 110 to send encrypted session data to host computing device 420. In some embodiments, peripheral device 230 may send encrypted data to a group of host computing devices to whom encrypted third key was sent in step 1270. Peripheral device 230, upon completion of step 1290, also completes (step 1299) executing method 1200.

In step 1295, peripheral device 230 may securely communicate with a host computing device group (including host computing device 420) by encrypting data at peripheral device 230 and sending it to host computing device 420. Peripheral device 230 may also decrypt data received from host computing device 420 using second key 432. Peripheral device 230 participating in secure communication with multiple host computing devices may still use the same second key to encrypt data sent to multiple host computing devices and decrypt data received from the same host computing devices. Peripheral device 230, upon completion of step 1295, also completes (step 1299) executing method 1200.

Figure 13:
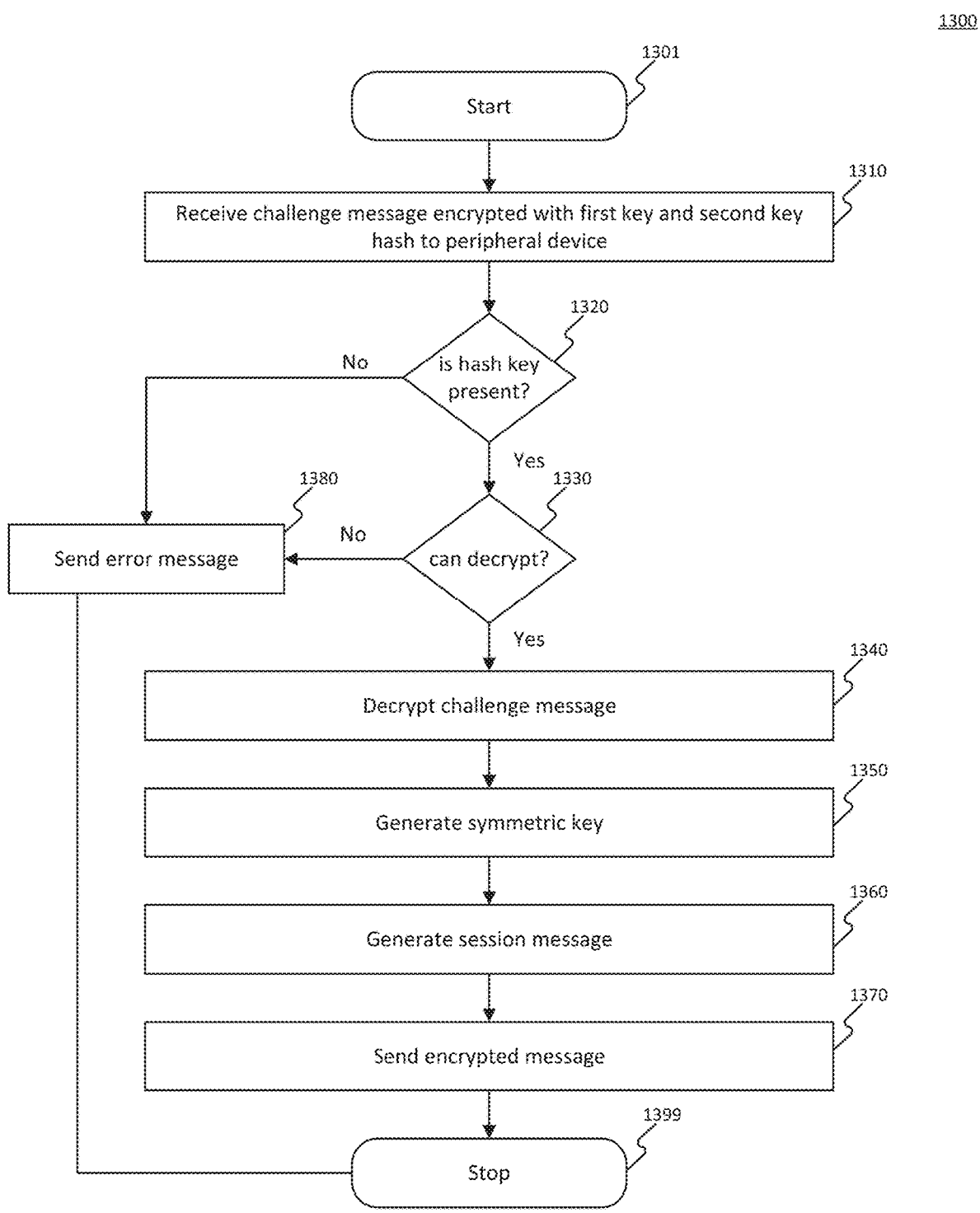
FIG. 13 is a flowchart depicting operations of an exemplary method for initiating a secure communication session by a registered peripheral device, according to some embodiments of the present disclosure.

FIG. 13 is a flowchart depicting operations of an exemplary method 1300 for initiating a secure communication session (e.g., communication session 710) by registered peripheral device 230, according to some embodiments of the present disclosure. The steps of method 1300 may be performed by peripheral device 230 for purposes of illustration. It will be appreciated that the illustrated method 1300 may be altered to modify the order of steps and to include additional steps.

In step 1310, peripheral device 230 may receive payload (e.g., session data packet 960) that includes encrypted challenge message (e.g., challenge 961) from a host computing device (host computing device 420). Peripheral device 230 may consider receipt of a challenge message as a request from host computing device 420 to initiate a secure communication using an encryption mechanism. In some embodiments, the receipt of the challenge message may be considered a request to restart a previously paused secure communication between peripheral device 230 and host computing device 420. The received payload may also include a hash to a second key (e.g., second key 432). Peripheral device 230 may use the hash of second key 432 to determine the host computing device (e.g., host computing device 420) who may have previously shared second key 432 and/or hash of second key 432 during the registration process (as described in connection with FIG. 11 above).

In step 1320, peripheral device 230 may check if the received challenge message includes a hash key (e.g., hash 962). In some embodiments, the peripheral device 230 may check if the received hash 962 is a valid hash key by using it to lookup in hash map 241.

If the answer in step 1320 is no, the method 1300 jumps to step 1380. If the answer in step 1320 is yes, i.e., the message includes a hash key (e.g., hash 962), the method 1300 proceeds to step 1330. The peripheral device 230 may utilize the hash key 961 to identify second key 432 associated with host computing device 420. The peripheral device 230 may request main processing unit 260 to lookup hash 962 find second key 432. The hash map 241 may provide the storage location of second key 432 in secure enclave 250 used to retrieve second key 432 using trusted partner module 253. The trusted partner module 253 may access the second key 432 from key store 252 and share it with peripheral device 230 to decrypt challenge 961.

If the answer in step 1330 is no, the method 1300 jumps to step 1380. If the answer in step 1320 is yes, i.e., is challenge 961 is valid and can be decrypted, the method 1300 proceeds to step 1330. Peripheral device 230 may check the validity of challenge 961 by evaluating the checksum of received challenge 961 and comparing it with a checksum in the received payload (e.g., data packet 960).

In step 1340, peripheral device 230 may decrypt challenge 961 using second key 432. The peripheral device 230 may retrieve the hash 962 from the data packet 960, including challenge 961. Peripheral device 230 may parse the challenge message obtained by decrypting challenge 961 using second key 432. Parsing challenge message may include executing instructions in the challenge 961 received by peripheral device 230 from host computing device 420. In some embodiments, peripheral device 230 may parse the challenge message to access configurable parameters to initiate a secure communication session. The configurable parameters may include the number of messages, amount of data, and time of communication session requested by host computing device 420. Peripheral device 230 may also parse challenge message to learn about communication session termination criteria as described in connection with FIG. 9 above.

In step 1350, peripheral device 230 may generate a session key (e.g., session key 871) used in securing messaged shared during a communication session. Session key 871 may be a symmetric cryptographic key used for encryption and decryption of data captured by peripheral device 230 and decryption of captured data received by host computing device 420.

In step 1360, peripheral device 230 may generate an encrypted message indicating initiation of communication session and details of a secure communication session. Peripheral device 230 may indicate initiation of the communication session by including the decrypted challenge message in a session data packet (e.g., data packet 870). Encrypted message may also include session key 871 generated in step 1350 to have secure communication. Peripheral device 230 may encrypt data packet, including decrypted challenge message and session key 871 with second key 432.

In step 1370, peripheral device 230 may send an encrypted message with session key 871 to host computing device 420 associated with second key 432. In some embodiments, peripheral device 230 may broadcast an encrypted message to all host computing devices 120. In some embodiments, peripheral device 230 may multicast an encrypted message to host computing devices capable of communicating with peripheral device 230.

Peripheral device 230 may begin sending captured data using session key 871 to host computing device 420. In some embodiments, peripheral device 230 may not send a session message until it receives an acknowledgment for receipt of session key 871.

Peripheral device 230, upon completion of step 1370, completes (step 1499) executing method 1300.

Figure 14:
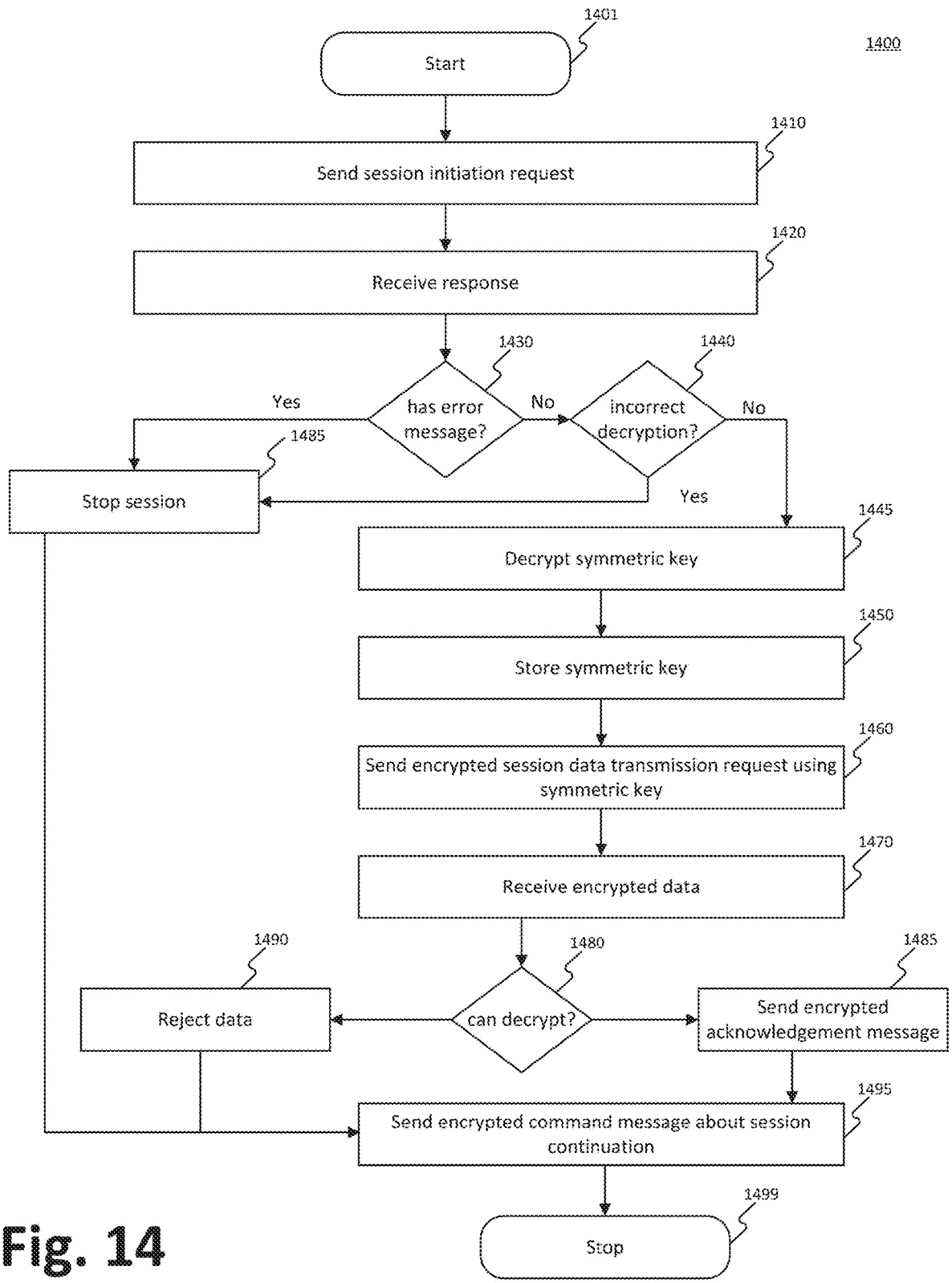
FIG. 14 is a flowchart depicting operations of an exemplary method for a secure communication session in a system, according to some embodiments of the present disclosure.

FIG. 14 is a flowchart depicting operations of an exemplary method 1400 for a secure communication session in system 100, according to some embodiments of the present disclosure. The steps of method 1400 may be performed by components of system 100 for purposes of illustration. It will be appreciated that the illustrated method 1400 may be altered to modify the order of steps and to include additional steps.

In step 1410, a host computing device (e.g., host computing device 420, desktop device 823) may send an encrypted message to a peripheral device (e.g., peripheral device 230). The encrypted message may include a challenge (e.g., challenge 961) indicating a request to initiate a communication session. The communication session initiation request may include a request to initiate data capture by peripheral device 230.

In step 1420, desktop device 823 may receive a response. The response may include acceptance from peripheral device 230 to initiate a secure communication session initiation requested in step 1410.

In step 1430, desktop device 823 may verify if the received response includes an error message. An error message may be represented by an error code that needs to be looked up by desktop device 823 to determine the actual error message. Desktop device 823 may be implemented using computing device 300. Desktop device 823 may receive the response through peripheral devices controller 323 or network interface 318. Upon reviewing the received response, if the answer to the question in step 1430 is yes, i.e., the received response includes an error message, then execution of method 1400 may jump to step 1485.

If the answer to the question in step 1420 is no, i.e., the received response has no error message, then execution of method 1400 may proceed to step 1440. In step 1440, desktop device 823 may verify if the received response is valid by evaluating the received response checksum and comparing it against the checksum provided along with the response. If the answer to the question in step 1440 is yes, i.e., the evaluated and checksum provided with response do not match, then the execution of method 1400 may jump to step 1485.

If the answer to the question in step 1440 is no, i.e., the received response is considered valid as the evaluated and checksum provided with the response match, then execution of method 1400 may proceed to step 1445. In step 1445, host computing device may decrypt the received response to access a symmetric key (e.g., session key 741, symmetric key 982). Desktop device 823 may decrypt the received response using a first key (e.g., private key 851) of a cryptographic key pair (e.g., cryptographic key pair 851-852) that was previously shared with peripheral device 230. Desktop device 823 implemented using computing device 300 may use CPUs 320 to decrypt the received response to access the symmetric key 982.

In some embodiments, the received response may include a decrypted challenge message of challenge 961 sent in step 1410. The decrypted challenge may indicate the success of the encrypted challenge. In some embodiment, the symmetric key's receipt may be considered an indication of a successful encrypted challenge.

In some embodiments, upon identifying a successful encrypted challenge, desktop device 823 may validate peripheral device 230. Desktop device 823 may add peripheral device 230 or an identifier of peripheral device 230 to a list of trusted peripheral devices to communicate with. The list may be refreshed after the current communication session or maintained for all communication (current and future) with peripheral device 230. The length of time of validation of peripheral device 230 may be configurable and provided by a user (e.g., user 460).

In step 1450, host computing device 420 may store the decrypted symmetric key 982 from step 1445 in a crypto keys database 150. Host computing device 420 may associate an identifier of peripheral device 230 with symmetric key 982 before storing the symmetric key 982 in crypto keys database 150. An identifier of peripheral device 230 may be a unique ID such as a network IP address, a MAC address, or the device's serial number. In some embodiments, desktop device 823 may use the second key (e.g., public key 852) shared with peripheral device 230 as its identifier. Symmetric key 982 may be a temporary key that expires at the end of the requested communication session and is stored in memory (e.g., system memory 321).

In step 1460, desktop device 823 may send a session data transmission request to peripheral device 230. Desktop device 823 may send an acknowledgment of symmetric key 982's receipt in place of a specialized session data transmission request, resulting in the transmission of session data by peripheral device 230. Desktop device 823 may encrypt the session transmission request using symmetric key 982.

In step 1470, desktop device 823 may receive encrypted data from peripheral device 230. Peripheral device 230 may directly send the encrypted data to desktop device 823. Peripheral device 230 may communicate with desktop device 823 implemented on computing device 300 through peripheral devices controller 323. For example, a USB based camera peripheral device connected to desktop device 823 may receive data transmitted by the camera peripheral device at a USB hub peripheral devices controller. In some embodiments, desktop device 823 may receive the encrypted message over cloud network 140 at network interface 318.

In step 1485, desktop device 823 may send an acknowledgment for the received encrypted data. Desktop device 823 may send an acknowledgment upon successful decryption of the received data. In some embodiments, desktop device 823 may also need to validate the received data before sending an acknowledgment message. Desktop device 823 may validate the received message by evaluating the received message checksum and matching it with the checksum provided by the peripheral device 230 as part of the received data. Upon successful decryption and validation of the received data, desktop device 823 may store the received data in memory (e.g., system memory 321) or persisted storage (e.g., storage 328).

If the answer to the question in step 1430 or 1440 is yes, i.e., there was an issue with the received response, then the execution of method 1300 jumps to step 1385. In step 1485, desktop device 823 may stop the session. Desktop device 823 may stop the communication session by deleting the symmetric key 982. Desktop device 823 may additionally share the termination of session with peripheral device 230 using a command message in step 1490.

In step 1490, desktop device 823 may send an encrypted command message to continue receiving session data from peripheral device 230. In some embodiments, the command message may be part of the acknowledgment message sent in step 1480. The command message may include error codes related to the received data in step 1470. The error code may indicate a request to retransmit data from step 1470. In some embodiments, the command message may indicate a request for termination of the communication session or include additional information for the future transmitted data. For example, the additional information may include an update to the interval or amount of data or pause the data requested by the desktop device 823. System 100, upon completion of step 1490, completes (step 1499) executing method 1400.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a communication interface method to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces with any of a hardwired, wireless, optical, or similar, medium to communicate with another device, such as a memory bus interface, a processor bus interface, an Internet connection, a disk controller, and the like. The communication interface may be configured by providing configuration parameters and/or sending signals to prepare the communication interface to provide a data signal describing the software content. The communication interface may be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within a software developer's skill. The various programs or program modules may be created using a variety of programming techniques. For example, program sections or program modules may be designed by means of JavaScript, Scala, Python, Java, C, C++, assembly language, or any such programming languages, as well as data encoding languages (such as XML, JSON, etc.), query languages (such as SQL), presentation-related languages (such as HTML, CSS, etc.) and data transformation language (such as XSL). One or more of such software sections or modules may be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A host computing device that is configured for communications with a peripheral device, the host computing device comprising:
    a non-transitory computer readable medium including instructions that, when executed by at least one processor, cause the at least one processor to perform operations for participating in a validation process to authorize communication with the peripheral device, the operations comprising:
        sending, from the host computing device, a second key that is part of a cryptographic key pair comprising a first key and the second key, wherein the second key is uniquely associated with one or more peripheral devices including the peripheral device;
        receiving encrypted data from the peripheral device, wherein the encrypted data contains test data encrypted by the peripheral device using the second key;
        validating an identity of the peripheral device based on a decryption, using the first key, of the encrypted data; and
        generating a secure session conditional on a successful result of the validating.

2. The host computing device of claim 1, wherein the operations further comprise participating in secure communications in the secure session between the host computing device and the peripheral device conditional on the successful result of the validating.

3. The host computing device of claim 1, wherein the operations further comprise participating in secure communications between a group of host computing devices and the peripheral device conditional on the successful result of the validating.

4. The host computing device of claim 1, wherein the generating a secure session further comprises:
    receiving authentication information from the peripheral device; and
    validating a user of the peripheral device.

5. The host computing device of claim 1, wherein the operations further comprise generating secure sessions for communication between a group of peripheral devices and the host computing device conditional on the successful result of the validating.

6. The host computing device of claim 1, wherein the operations further comprise:
    receiving a third key, wherein the third key is accessed at the peripheral device and encrypted using the second key;
    wherein the host computing device is configured to decrypt the encrypted third key with the first key, yielding the third key, and to encrypt session traffic to the peripheral device using the third key.

7. The host computing device of claim 6, wherein session traffic from the peripheral device to the host computing device is encrypted by the peripheral device using the third key.

8. The host computing device of claim 1, wherein the validating is performed on a per-connection basis each time the peripheral device is connected to the host computing device.

9. The host computing device of claim 1, wherein the peripheral device stores the second key in a secure memory environment of the peripheral device comprising a memory and a processor, both of which are separate from, and operate independently from, a main memory and a main processor of the peripheral device.

10. The host computing device of claim 1, wherein the peripheral device is connected to the host computing device via at least one of: a Universal Serial Bus or a High-Definition Multimedia Interface.

11. The host computing device of claim 1, wherein the operations further comprise receiving a success message that was generated conditional on the peripheral device having successfully received the second key.

12. The host computing device of claim 1, wherein the host computing device stores multiple different keys of a same type as the first key, the multiple different keys enabling the host computing device to authorize a plurality of corresponding different peripheral devices.

13. The host computing device of claim 1, wherein the data associated with the second key is a hash of the second key.

14. A computer implemented method for host computing device to participate in a validation process to authorize communication with the peripheral device, the method comprising:
    sending, from the host computing device, a second key that is part of a cryptographic key pair comprising a first key and the second key, wherein the second key is uniquely associated with one or more peripheral devices including the peripheral device;
    receiving encrypted data from the peripheral device, wherein the encrypted data contains test data encrypted by the peripheral device using the second key; and
    validating an identity of the peripheral device based on a decryption, using the first key, of the encrypted data.

15. The computer-implemented method of claim 14, further comprising:
    sending, from the host computing device, an encrypted challenge to the peripheral device; and
    receiving, from the peripheral device, a response to the encrypted challenge;
    wherein the peripheral device decrypts the encrypted challenge using the second key.

16. The computer-implemented method of claim 15, further comprising:
    determining, at the host computing device, whether the response to the encrypted challenge is successful; and
    performing at least one of the following operations, conditional on the determination of whether the response to the encrypted challenge is successful:
        validating the peripheral device as a trusted device for connection with the host computing device,
        validating the peripheral device as a trusted device for a current session with the host computing device,
        allowing initialization of a session between the host computing device and the peripheral device,
        allowing session traffic to be exchanged between the host computing device and the peripheral device,
        denying initiation of a session between the host computing device and the peripheral device, or
        terminating a session between the host computing device and the peripheral device.

17. The computer-implemented method of claim 14, further comprising initiating, conditional on the validation of the message being successful, a session between the peripheral device and the host computing device.

18. The computer-implemented method of claim 14, further comprising validating the peripheral device conditional on the validation of the message being successful.

19. The computer-implemented method of claim 14, further comprising accessing, by the host computing device, a new cryptographic key pair to replace the cryptographic key pair, the new cryptographic key pair comprising a new first key and a new second key.

20. The computer-implemented method of claim 19, further comprising:
- storing, by the host computing device, the new first key and data associated with the new second key;
- providing the new second key to the peripheral device, wherein the peripheral device is configured to store the new second key in the secure memory environment;
- receiving, at the host computing device, a new message from the peripheral device;
- validating, at the host computing device, the new message by attempting to decrypt the new message using the new first key;
- receiving a new encrypted third key from the peripheral device, the new third key having been encrypted by the peripheral device using the new second key; and
- encrypting, at the host computing device, new session traffic from the host computing device to the peripheral device using a decrypted version of the new encrypted third key.

* * * * *